(12) United States Patent
Komazawa et al.

(10) Patent No.: US 6,212,003 B1
(45) Date of Patent: Apr. 3, 2001

(54) OPTICAL AMPLIFIER EVALUATING METHOD AND OPTICAL AMPLIFIER EVALUATING APPARATUS

(75) Inventors: Hiroshi Komazawa; Yukio Tsuda, both of Isehara (JP)

(73) Assignee: Anritsu Corporation, Tokyo (JP)

( * ) Notice: Subject to any disclaimer, the term of this patent is extended or adjusted under 35 U.S.C. 154(b) by 0 days.

(21) Appl. No.: 09/403,051

(22) PCT Filed: Nov. 11, 1998

(86) PCT No.: PCT/JP98/05074

§ 371 Date: Oct. 12, 1999

§ 102(e) Date: Oct. 12, 1999

(87) PCT Pub. No.: WO99/43054

PCT Pub. Date: Aug. 26, 1999

(30) Foreign Application Priority Data

Feb. 23, 1998 (JP) .................................................. 10-057530

(51) Int. Cl.[7] .............................. H01S 3/00; G01N 21/84
(52) U.S. Cl. ............................................ 359/341; 356/73.1
(58) Field of Search ............................ 359/341; 356/73.1

(56) References Cited

U.S. PATENT DOCUMENTS

| 5,340,979 | 8/1994 | Baney et al. . |
| 5,596,440 | * 1/1997 | Patz et al. ............................. 359/177 |
| 5,677,781 | 10/1997 | Mori et al. . |
| 5,812,253 | 9/1998 | Nishikawa . |
| 5,917,649 | * 6/1999 | Mori et al. ............................. 359/341 |

FOREIGN PATENT DOCUMENTS

| 6-224492 | 8/1994 | (JP) . |
| 8-247894 | 9/1996 | (JP) . |
| 9-18391 | 1/1997 | (JP) . |
| 9-43096 | 2/1997 | (JP) . |
| 9-264811 | 10/1997 | (JP) . |

WO 98/53538    11/1998  (WO) .

OTHER PUBLICATIONS

D.M. Baney et al; "Pulsed–Source Technique for Optical Amplifier Noise Figure Measurement"; 1992; pp. 509–512; Communications, ECOC'92, Berlin.

H. Chou et al; "Inhomogeneous Gain Saturation of Erbium–Doped Fiber Amplifiers"; 1995; pp. 92–95; Tech. Digest paper ThE1–1.

Denshi Jouhou Tsuushin Gakkai Tsuushin Sosaieti Takai (Japan) Communications Society, Institute of Electronics, Information & Communication Engineers; p. 404.

* cited by examiner

Primary Examiner—Mark Hellner
(74) Attorney, Agent, or Firm—Frishauf, Holtz, Goodman, Langer & Chick, P.C.

(57) ABSTRACT

In an optical amplifier evaluating system of this invention, a pulse method using optical modulators and a probe method are combined to obtain a gain G and noise figure NF of an optical fiber amplifier. A first optical modulator turns on and off signal light output from a first light source. An optical multiplexer multiplexes the optical signal turned on and off by the first optical modulator and probe light output from a second light source. This optical signal multiplexed by the optical multiplexer is selectively fed into an optical fiber amplifier. A controller properly switches optical path switches to allow an optical spectrum analyzer to measure (1) the light intensity of an input signal of the probe light to the optical fiber amplifier, (2) the light intensity in a region where signal light extracted from the output signal light from the optical fiber amplifier by a second optical modulator is in an OFF period and the probe light is output, and (3) the light intensity in a region where the signal light extracted by the second optical modulator is in the OFF period and no probe light is output. On the basis of measured light intensities (1), (2), and (3), the controller calculates the gain G and noise figure NF of the optical fiber amplifier. In this manner, the optical amplifier evaluating system of this invention can accurately obtain the gain G and noise figure NF of the optical fiber amplifier.

12 Claims, 13 Drawing Sheets

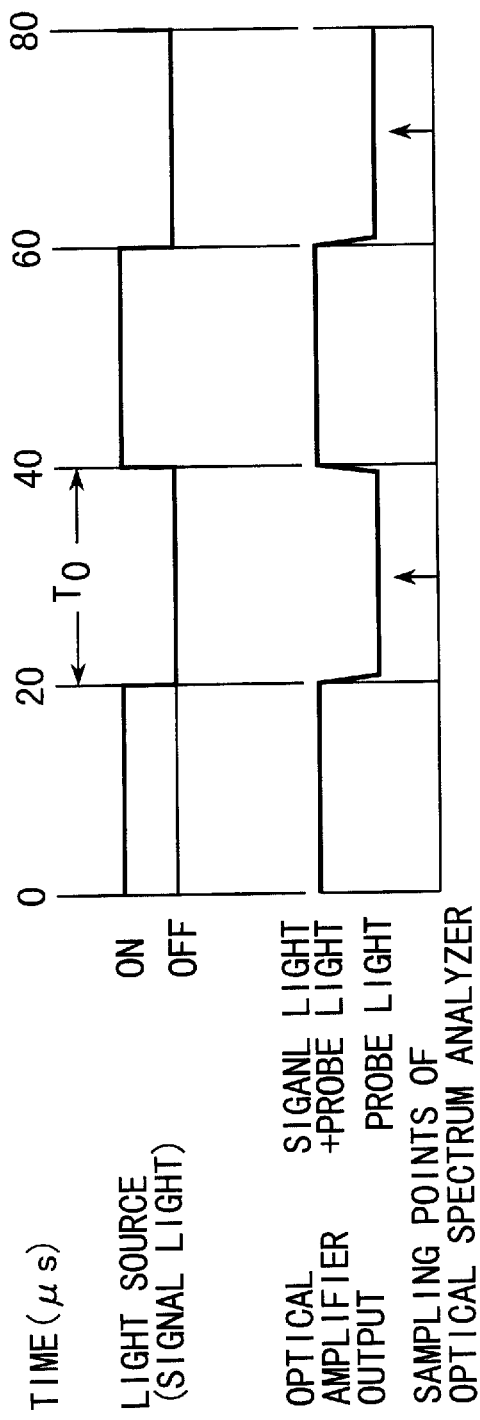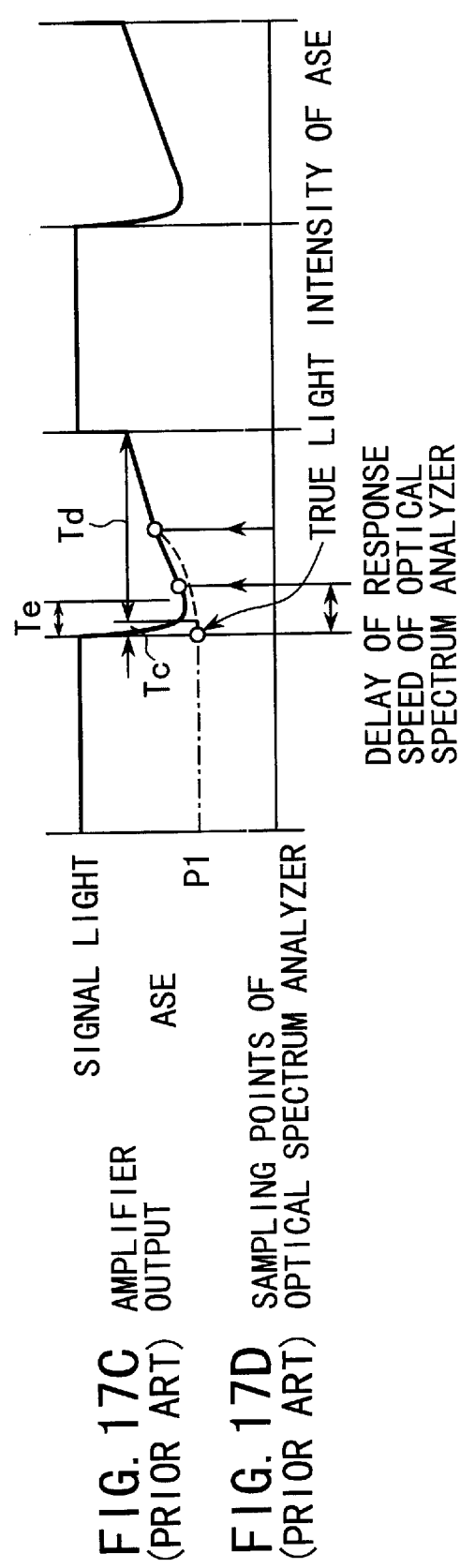
FIG. 17A (PRIOR ART)
FIG. 17B (PRIOR ART)
FIG. 17C (PRIOR ART)
FIG. 17D (PRIOR ART)

OPTICAL AMPLIFIER EVALUATING METHOD AND OPTICAL AMPLIFIER EVALUATING APPARATUS

TECHNICAL FIELD

The present invention relates to an optical amplifier evaluating method and optical amplifier evaluating apparatus for evaluating the characteristics of an optical fiber amplifier and, more particularly, to an optical amplifier evaluating method and optical amplifier evaluating apparatus for simply evaluating the gain and noise figure as the wavelength characteristics of an optical fiber amplifier by combining a pulse method using optical modulators and a probe method.

BACKGROUND ART

As is well known, in wavelength division multiplexing (WDM) optical communications used in recent large-capacity long-distance optical transmission systems, level deviations between channels lead to deterioration of signals.

Correspondingly, optical amplifiers used in long-distance transmission such as submarine optical cables must have flat and wide-band gain wavelength characteristics in addition to conventional low noise and high efficiency.

This makes evaluation of the wavelength characteristics of an optical fiber amplifier important.

An optical fiber amplifier is of course a kind of an amplifier. Therefore, it is necessary to measure a gain G indicated by the ratio of a light intensity PIN of an input optical signal to a light intensity POUT of an output optical signal.

As is well known, owing to its light amplification mechanism, an optical fiber amplifier produces spontaneous emission, even when no optical signal is input to its input terminal, and this spontaneous emission is amplified and output to its output terminal.

This amplified spontaneous emission (ASE) acts as noise with respect to an amplified optical signal.

It is, therefore, important to measure the light intensity PASE of this amplified spontaneous emission (ASE).

As an index indicating the noise resistance of an optical fiber amplifier, a noise figure NF indicated by equation (1) below which includes the measured gain G and light intensity PASE is generally employed:

$$NF = f(G, PASE, \nu, \Delta\nu) \qquad (1)$$

where $\nu$: the optical frequency of an input optical signal

G: gain $\Delta\nu$: the measurement frequency resolution width (measurement frequency width) of a light intensity measurement apparatus Hence, the characteristics of an optical fiber amplifier are evaluated in terms of the gain G and the noise figure NF.

Conventionally, to evaluate the characteristics of an optical fiber amplifier, in an arrangement as shown in FIG. 10, a laser light source 101 and an optical fiber amplifier 5 are connected to an optical spectrum analyzer 103 via an optical path switch 102.

First, the optical path switch 102 is closed to the laser light source 101. The optical spectrum analyzer 103 obtains the light intensity PIN, shown in FIG. 11, with respect to an optical wavelength λ of an input optical signal to the optical fiber amplifier 5.

Next, the optical path switch 102 is closed to the optical fiber amplifier 5. The optical spectrum analyzer 103 obtains the light intensity POUT, shown in FIG. 11, at the optical wavelength λ of an output optical signal from the optical fiber amplifier 5.

Accordingly, the gain G is calculated by $$G = POUT/PIN \qquad (2)$$

As shown in FIG. 11, however, the light intensity PASE of amplified spontaneous emission (ASE) is buried in the light intensity POUT of the amplified output optical signal. This makes the light intensity PASE of the amplified spontaneous emission (ASE) difficult to directly measure.

As a method of measuring the light intensity PASE of this amplified spontaneous emission (ASE), a level interpolation method, polarization nulling method, and pulse method have been proposed.

(Explanation of Pulse Method)

Of these three methods, the pulse method (e.g., Jpn. Pat. Appln. KOKAI Publication Nos. 6-224492 and 9-18391) uses the fact that the recovery time to the ground state of rare earth element light of metastable erbium doped in the core of an optical fiber of an optical fiber amplifier is relatively long. In this method, an input optical signal to an optical fiber amplifier is turned on and off at periods shorter than this recovery time, the light intensity POUT of an output optical signal is measured during the ON period, and the light intensity PASE of the amplified spontaneous emission (ASE) is measured during the OFF period.

FIG. 12 illustrates an optical fiber amplifier evaluating apparatus of the prior application using this pulse method.

That is, an optical modulation unit 21 shown in FIG. 12 is proposed in an international application (PCT/JP98/02015) filed by this international applicant.

As depicted in FIG. 12, a light source 201a for outputting a wavelength λ1 is connected to an optical attenuator 202a, a light source 201b for outputting a wavelength λ2 is connected to an optical attenuator 202b, . . . , a light source 201n for optically outputting a wavelength λn is connected to an optical attenuator 202n.

An optical multiplexer 203 multiplexes, as will be described later, light components from these optical attenuators 202a, 202b, . . . , 202n.

The optical signal multiplexed by this optical multiplexer 203 is input to an optical fiber amplifier 5 via the optical modulation unit 21.

The output optical signal from this optical fiber amplifier 5 is again input to an optical spectrum analyzer 207 via the optical modulation unit 21.

(Measurement of Light Intensity PIN)

A controller 208 switches, as indicated by the dotted lines in FIG. 12, a first optical path switch 28 and a second optical path switch 33 in the optical modulation unit 21. The controller 208 also sends a light intensity measurement command to the optical spectrum analyzer 207.

In this state, as shown in FIG. 13, a first optical modulator 23 in the optical modulation unit 21 modulates the light, that is emitted by the light sources 201a, 201b, . . . , 201n and so wavelength-multiplexed as to have a plurality of wavelengths λ1, λ2, λ3, . . . , λn−1, λn, . . . by the optical multiplexer 203, into a rectangular optical signal which is turned on and off at a predetermined period T0 (FIG. 2A).

The optical signal modulated by this first optical modulator 23 is fed into the optical spectrum analyzer 207 via the first optical path switch 28 and the second optical path switch 33.

The optical spectrum analyzer 207 analyzes the spectrum of this incoming light and obtains the light intensity PIN (λ=λ1, λ2, λ3, . . . , λn−1, λn, . . . ) at each wavelength λ.

The optical spectrum analyzer 207 sends the measured light intensity PIN(λ) to the controller 208.

(Measurement of Light Intensity POUT)

As shown in FIG. 12, the controller 208 sets the first optical path switch 28 in the steady state indicated by the solid lines and the second optical path switch 33 in switched state indicated by the dotted lines, and sends a light intensity measurement command to the optical spectrum analyzer 207.

In this state, as shown in FIG. 13, the first optical modulator 23 in the optical modulation unit 21 modulates the light, that is emitted by the light sources 201a, 201b, ..., 201n and so wavelength-multiplexed as to have the wavelengths λ1, λ2, λ3, ..., λn−1, λn, ... by the optical multiplexer 203, into a rectangular optical signal which is turned on and off at the predetermined period T0.

The optical signal modulated by this first optical modulator 23 is fed into the optical fiber amplifier 5 as an object to be measured and is optically amplified.

The amplified optical signal output from this optical fiber amplifier 5 is directly fed into the optical spectrum analyzer 207 via the first optical path switch 28 and the second optical path switch 33 in the optical modulation unit 21.

The optical spectrum analyzer 207 analyzes the spectrum of this incident light and obtains the light intensity POUT (λ=λ1, λ2, λ3, ..., λn−1, λn, ...) at each wavelength λ.

The optical spectrum analyzer 207 sends the measured light intensity POUT(λ) to the controller 208.

(Measurement of Light Intensity PASE)

As shown in FIG. 12, the controller 208 sets the first optical path switch 28 and the second optical path switch 33 in the steady state indicated by the solid lines, and sends a light intensity measurement command to the optical spectrum analyzer 207.

In this state, as shown in FIG. 13, the first optical modulator 23 in the optical modulation unit 21 modulates the light, that is emitted by the light sources 201a, 201b, ..., 201n and so wavelength-multiplexed as to have the wavelengths λ1, λ2, λ3, ..., λn−1, λn, ... by the optical multiplexer 203, into a rectangular optical signal which is turned on and off at the predetermined period T0.

The optical signal modulated by this first optical modulator 23 is fed into the optical fiber amplifier 5 as an object to be measured and is optically amplified.

The amplified optical signal output from this optical fiber amplifier 5 is fed into a second optical modulator 35 via the first optical path switch 28 and the second optical path switch 33 in the optical modulation unit 21.

From the amplified optical signal fed into the second optical modulator 35, only a partial period TA (FIG. 2D) of its OFF period is extracted and fed into the optical spectrum analyzer 207 via the second optical path switch 33.

The optical spectrum analyzer 207 regards this incoming optical signal in the partial period TA of the OFF period in the amplified optical signal, as amplified spontaneous emission (ASE), and obtains the light intensity PASE (λ=λ1, λ2, λ3, ..., λn−1, λn, ...) at each wavelength λ of this amplified spontaneous emission.

The optical spectrum analyzer 207 sends the measured light intensity PASE(λ) to the controller 208.

(Explanation of Probe Method)

The probe method measures the wavelength characteristics of an optical fiber amplifier in WDM transmission.

That is, this probe method measures the characteristics by using weak light (probe light) having no influence on the inversion distribution state of an optical fiber amplifier fixed by signal light (saturated signal light).

In this probe method, signal light having a single wave to several waves is used to set an optical fiber amplifier in the same state as WDM transmission.

FIG. 14 shows an evaluation method of measuring the wavelength characteristics of an optical fiber amplifier by using this probe method.

That is, as shown in FIG. 14, an optical multiplexer 303 multiplexes output signal light from a light source 301 and probe light emitted by a light source 302 via an optical attenuator 309.

(Measurement of Light Intensity PIN)

By setting optical path switches 304 and 306 in states indicated by the dotted lines in FIG. 14, the input light intensity PIN of the light source 302 with respect to an optical fiber amplifier 5 is obtained.

(Measurement of Light Intensity POUT)

By setting the optical path switches 304 and 306 in states indicated by the solid lines in FIG. 14, the amplified output light intensity POUT of the light source 302, which is output from the optical fiber amplifier 5, is obtained.

As shown in FIGS. 15A and 15B, from the optical spectrum of the amplified output light intensity POUT of the light source 302, PASE is obtained by the level interpolation method.

FIG. 15B is an enlarged view of an output light intensity POUT component enclosed with the circular dotted line in FIG. 15A.

(Combination of Conventional Pulse Method and Probe Method)

FIG. 16 depicts an evaluation apparatus for measuring the wavelength characteristics of an optical fiber amplifier by combining the conventional pulse method and probe method.

That is, as shown in FIG. 16, a light source 401 for outputting signal light and a light source 402 for outputting probe light are connected to optical attenuators 408 and 409, respectively.

An optical multiplexer 403 multiplexes the output signal light (FIG. 17A) from the optical attenuator 408 and the output probe light from the optical attenuator 409.

The output light from this optical attenuator 403 is input to an optical fiber amplifier 5 via an optical path switch 404.

Also, the output optical signal (FIG. 17B) from the optical fiber amplifier 5 is input to an optical spectrum analyzer 407 via an optical path switch 406.

(Measurement of Light Intensity PIN)

The light source 401 generates signal light (FIG. 17A) from an optical pulse modulated by a pulse from a pulse pattern generator 400.

The optical output from the light source 401 is shut off by a shutter of the optical attenuator 408, and the optical path switches 404 and 406 are set in states indicated by the dotted lines in FIG. 16. In this manner, the input light intensity PIN at each wavelength (λ) of the light source 402 with respect to the optical fiber amplifier 5 is obtained.

(Measurement of Light Intensity POUT)

Next, the optical output from the light source 401 is transmitted by opening the shutter of the optical attenuator 408, and the optical path switches 404 and 406 are set in states indicated by the solid lines in FIG. 16. Consequently, the light intensity POUT of probe light in which modulation of the signal light shown in FIG. 17A is amplified at the central sampling point (FIG. 17B) in the OFF period is measured in the half period of the optical pulse in synchronism with the optical spectrum analyzer 407.

(Measurement of Light Intensity PASE)

In addition, by shutting off the optical output from the light source 402 in this state by the shutter of the optical attenuator 409, the light intensity PASE of amplified spontaneous emission, which is amplified at the moment the signal light modulation is turned off, is measured in the half period of the optical pulse in synchronism with the optical spectrum analyzer 407.

Unfortunately, the aforementioned conventional optical amplifier evaluating method and optical amplifier evaluating apparatus still have problems to be solved.

That is, the apparatus as shown in FIG. 12 poses no problem when measuring the wavelength characteristics of an optical amplifier in a predetermined range. To perform measurements in a broad range, however, it is necessary to prepare wavelength-multiplexed signal light throughout measurement wavelengths as shown in FIG. 13 and measure the gain and noise figure at each signal wavelength. This enlarges and complicates the apparatus.

In the apparatus using the conventional probe method as shown in FIG. 14, if the probe light wavelength and the signal light (saturated signal light) wavelength are close to each other, the spectra of these light components overlap each other.

If this is the case, the optical spectrum analyzer cannot measure the probe light component alone, so it is impossible to measure the characteristics in the vicinity of the signal light (saturated signal light) wavelength (1995 IEICE Communication Society Convention B-737 "Method of Measuring Gain of EDFA by Using Probe Light").

Furthermore, the apparatus combining the conventional pulse method and probe method as shown in FIG. 16 obtains a numerical value during a transient phenomenon of amplified spontaneous emission (ASE) a few ten $\mu$s after the modulation of the signal light is turned off, as shown in FIG. 17D, rather than a numerical value immediately after the signal light modulation is turned off, as shown in FIG. 17C, owing to a low response speed of an amplifier of the optical spectrum analyzer 407 and a low modulation frequency of the light source (signal light).

In the apparatus combining the conventional pulse method and probe method, therefore, the light intensity of amplified spontaneous emission is measured at several points and extrapolated by linear approximation to a certain time immediately after the modulation of the signal light is turned off. This results in poor measurement accuracy.

That is, the apparatus combining the conventional pulse method and probe method shown in FIG. 16 has poor measurement accuracy for the reason to be explained below.

The optical spectrum analyzer 407 used in the conventional apparatus combining the pulse method and probe method shown in FIG. 16 measures in synchronism with the OFF period of the light source (signal light) 401.

Accordingly, the frequency band of an internal light-receiving amplifier of this optical spectrum analyzer 407 must be widened. This increases noise and deteriorates the measurement accuracy.

Also, during the ON period of the light source (signal light) 401, high power is input to the optical spectrum analyzer 407, so the internal light-receiving amplifier of the optical spectrum analyzer 407 is saturated.

A period Te immediately after the light source (signal light) 401 is turned off shown in FIG. 17C indicates a period in which the internal light-receiving amplifier of the optical spectrum analyzer 401 recovers from this saturated state. No normal measurements can be performed during this period Te (from about a few hundred $\mu$s to about a few ms).

In FIG. 17C, reference symbol Tc denotes a period during which the light source (signal light) 401 keeps the same intensity as the ASE intensity in the ON period; and Td, a period during which the ASE intensity changes.

On the other hand, the response time (the time which rare earth element light of metastable erbium doped in the core of an optical fiber of an optical fiber amplifier requires to recover to the ground state) of the amplified spontaneous emission (ASE) of the optical fiber amplifier is also from about a few hundred $\mu$s to a few ms.

Accordingly, during the period in which the internal light-receiving amplifier of the optical spectrum analyzer 401 recovers from the saturated state and becomes capable of measurements, the amplified spontaneous emission (ASE) of the optical fiber amplifier has changed its intensity from that during the ON period of the light source (signal light) 401.

Hence, as shown in FIG. 17D, the changing amplified spontaneous emission intensity is measured at several sampling points, and a true amplified spontaneous emission intensity P1 (the intensity of the amplified spontaneous emission ASE in the ON period of the signal light 401) is analogically measured by approximation. This analogy also deteriorates the measurement accuracy.

DISCLOSURE OF INVENTION

The present invention has been made in consideration of the above situation, and has as its object to provide an optical amplifier evaluating method and optical amplifier evaluating apparatus for evaluating the wavelength characteristics of an optical amplifier, which, by combining the pulse method using optical modulators and the probe method, solve the drawbacks that (1) to measure the wavelength characteristics of an optical amplifier, it is necessary to prepare wavelength-multiplexed signal light throughout measurement wavelengths and measure the gain and noise figure at each signal wavelength, and this enlarges and complicates the apparatus, (2) the conventional probe method cannot measure the characteristics in the vicinity of a saturated signal wavelength, and (3) the conventional method combining the probe method and the pulse method has poor measurement accuracy.

To achieve the above object, according to one aspect of the present invention, there is provided an optical amplifier evaluating apparatus comprising a first light source device (1, 23, 50) for outputting rectangular signal light which is turned on and off at a predetermined period, a second light source device (2, 51) for outputting probe light, an optical multiplexer (25) for multiplexing the probe light and the signal light output from the first light source device and outputting multiplexed light to an input terminal of an optical fiber amplifier as an object to be measured, an optical modulator (35) for extracting, from an output from an output terminal of the optical fiber amplifier, an output signal in an OFF period of the signal light, a light intensity measuring device (38) for measuring intensity of input light to an input terminal, optical switching means (28, 33) for switching optical paths between the optical multiplexer, the optical fiber amplifier, the optical modulator, and the input terminal of the light intensity measuring device, and a controller for switching the optical switching means such that the light intensity measuring device measures a light intensity (Pout) in a region where the output signal light from the optical fiber amplifier is in an OFF period and the probe light is output, a light intensity (Pase) in a region where the signal light is in the OFF period and the probe light is not output, and a light intensity (Pin) of an input signal of the probe light to the optical fiber amplifier, and for obtaining a gain of the optical fiber amplifier from values of the measured light intensities.

To achieve the above object, according to another aspect of the present invention, there is provided an optical amplifier evaluating method comprising multiplexing output rectangular signal light from a first light source with probe light from a second light source by an optical multiplexer and applying multiplexed light to an optical fiber amplifier as an object to be measured, and extracting the signal light output from the optical fiber amplifier by an optical modulator and obtaining a gain and noise figure as wavelength characteristics of the optical fiber amplifier from a light intensity in a region where the signal light is in an OFF period and the probe light is output, a light intensity in a region where the signal light is in the OFF period and the probe light is not output, and a light intensity of an input signal of the probe light to the optical fiber amplifier.

To achieve the above object, according to still another aspect of the present invention, there is provided an optical amplifier evaluating method comprising multiplexing, by an optical multiplexer, output rectangular signal light from a first light source with light, obtained after output probe light from a second light source is modulated by an optical modulator into a rectangular optical signal which is turned on and off at a predetermined period and applying multiplexed light to an optical fiber amplifier (5) as an object to be measured, and extracting the signal light output from the optical fiber amplifier by another optical modulator and obtaining a gain and noise figure as wavelength characteristics of the optical fiber amplifier from a light intensity in a region where the signal light is in an OFF period and the probe light is output in an ON period, a light intensity in a region where the signal light is in the OFF period and the probe light is in the OFF period, and a light intensity of an input signal of the probe light to the optical fiber amplifier.

To achieve the above object, according to still another aspect of the present invention, there is provided an optical amplifier evaluating apparatus comprising a first light source for outputting signal light, a first optical modulator for modulating the signal light into a rectangular optical signal which is turned on and off at a predetermined period, a second light source for outputting probe light, and an optical multiplexer for multiplexing the probe light and optical signal output from the modulator and selectively outputting multiplexed light to an input terminal of an optical fiber amplifier as an object to be measured, optical path switching means for switching connection states of the input terminal and an output terminal of the optical fiber amplifier, a second optical modulator for extracting the signal light switched by the optical path switching means and output from the output terminal of the optical fiber amplifier, and a controller for controlling the first optical modulator, the second optical modulator, and the optical path switching means, and analyzing means for obtaining a light intensity in a region where the signal light is in an OFF period and the probe light is output, a light intensity in a region where the signal light is in the OFF period and the probe light is not output, and a light intensity of an input signal of the probe light to the optical fiber amplifier, thereby obtaining a gain and noise figure as wavelength characteristics of the optical fiber amplifier.

To achieve the above object, according to still another aspect of the present invention, there is provided an optical amplifier evaluating method comprising the steps of outputting rectangular signal light which is turned on and off at a predetermined period from a first light source device, outputting probe light from a second light source device, multiplexing the probe light and the signal light output from the first light source device by an optical multiplexer and outputting multiplexed light to an optical fiber amplifier as an object to be measured, extracting, by an optical modulator, an output signal in an OFF period of the signal light from an output from an output terminal of the optical fiber amplifier, measuring an intensity of input light to an input terminal by a light intensity measuring device, switching optical paths between the optical multiplexer, the optical fiber amplifier, the optical modulator, and the input terminal of the light intensity measuring device by optical switching means, and switching the optical switching means by a controller such that the light intensity measuring device measures a light intensity (Pout) in a region where the output signal light from the optical fiber amplifier is in an OFF period and the probe light is output, a light intensity (Pase) in a region where the signal light is in the OFF period and the probe light is not output, and a light intensity (Pin) of an input signal of the probe light to the optical fiber amplifier, thereby obtaining a gain of the optical fiber amplifier from values of the measured light intensities.

BRIEF DESCRIPTION OF DRAWINGS

FIGS. 17A to 17D are timing charts showing the light intensity measuring operation of the conventional optical amplifier evaluating apparatus.

BEST MODE OF CARRYING OUT THE INVENTION

Figure 1:
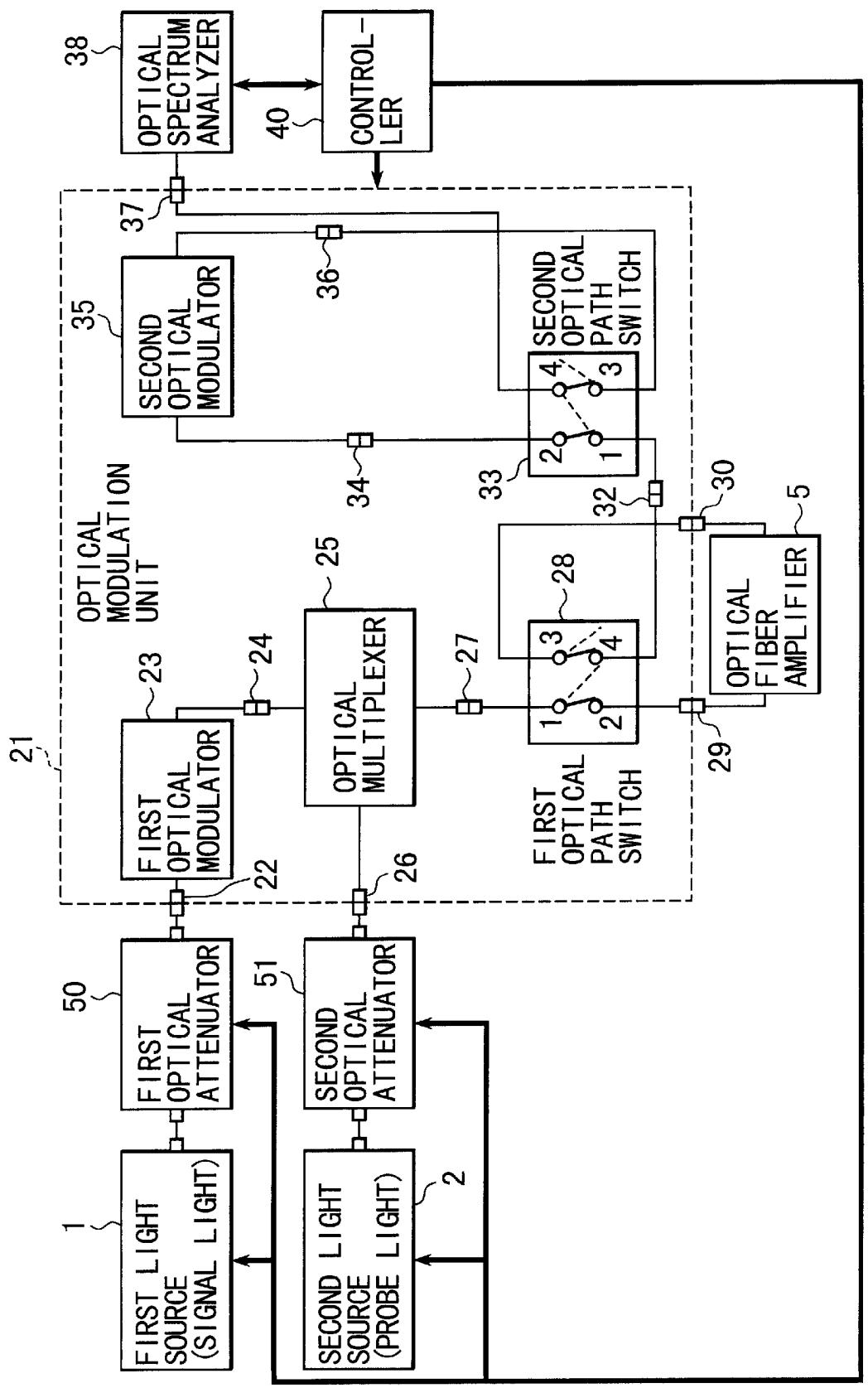
FIG. 1 is a block diagram showing an outline of the arrangement of an optical amplifier evaluating apparatus according to the first embodiment of the present invention.

An outline of the present invention will be described first.

That is, the most principal characteristic feature of the present invention is that a pulse method using optical modulators and a probe method are combined in evaluating the wavelength characteristics of an optical amplifier.

More specifically, an optical multiplexer 25 multiplexes an optical signal, which a first optical modulator 23 forms by turning on and off output signal light from a first light source 1, and output probe light from a second light source 2, and selectively feeds this multiplexed optical signal into an optical fiber amplifier 5.

A controller 40 properly switches optical path switches 28 and 33. An optical spectrum analyzer 38 measures light intensities (1) to (3) presented below and calculates Gain and NF:

(1) The light intensity of an input signal of probe light to the optical fiber amplifier.

(2) The light intensity in a region which is extracted by an optical modulator 35 from the output signal light from the optical fiber amplifier 5 and in which the signal light is in the OFF period and the probe light is output.

(3) The light intensity in a region which is extracted by the optical modulator 35 and in which the signal light is in the OFF period and no probe light is output.

In an optical amplifier evaluating method according to the first invention, the optical multiplexer 25 multiplexes output rectangular signal light from the first light source 1 and probe light from the second light source 2 and applies the multiplexed light to the optical fiber amplifier 5 as an object to be measured. The optical modulator 35 extracts the output signal light from this optical fiber amplifier. The gain and noise figure as the wavelength characteristics of the optical fiber amplifier are obtained from the light intensity of a region where the signal light is in the OFF period and the probe light is output, the light intensity in a region where the signal light is in the OFF period and no probe light is output, and the light intensity of an input signal of the probe light to the optical fiber amplifier.

In the first invention as described above, the rectangular signal light output from the first light source 1 is multiplexed with the probe light from the second light source 2 by the optical multiplexer 25 and applied to the optical fiber amplifier 5 as an object to be measured.

The optical modulator 35 extracts the output signal light from this optical fiber amplifier, thereby measuring the light intensity in a region where the signal light is in the OFF period and the probe light is output and the light intensity in a region where the signal light is in the OFF period and no probe light is output.

The light intensity of an input signal of the probe light to the optical fiber amplifier is also measured. From these measured light intensities, the gain and noise figure as the wavelength characteristics of the optical fiber amplifier are obtained.

In an optical amplifier evaluating method according to the second invention, an optical multiplexer 25 multiplexes rectangular signal light output from a first light source 1 and light obtained after an optical modulator 52 modulates output probe light from a second light source 2 into a rectangular optical signal which is turned on and off at predetermined periods, and applies the multiplexed light to an optical fiber amplifier 5 as an object to be measured. Another optical modulator 35 extracts the output signal light from this optical fiber amplifier. The gain and noise figure as the wavelength characteristics of the optical fiber amplifier are obtained from the light intensity in a region where the signal light is in an OFF period and the probe light is output in an ON period, the light intensity in a region where the signal light is in the OFF period and the probe light is in the OFF period, and the light intensity of an input signal of the probe light to the optical fiber amplifier.

In the second invention as described above, the optical multiplexer 25 multiplexes the rectangular signal light output from the first light source 1 and the light obtained after the optical modulator 52 modulates the probe light output from the second light source 2 into the rectangular optical signal which is turned on and off at predetermined periods, and applies the multiplexed light to the optical fiber amplifier 5 as an object to be measured. The optical modulator 35 extracts the output signal light from this optical fiber amplifier, thereby measuring the light intensity in a region where the signal light is in the OFF period and the probe light is output in the ON period and the light intensity of a region where the signal light is in the OFF period and the probe light is in the OFF period.

The light intensity of an input signal of the probe light to the optical fiber amplifier is also measured. From these measured light intensities, the gain and noise figure as the wavelength characteristics of the optical fiber amplifier are obtained.

An optical amplifier evaluating apparatus according to the third invention comprises a first light source 1 for outputting signal light, a first optical modulator 23 for modulating the signal light into a rectangular optical signal which is turned on and off at predetermined periods, a second light source 2 for outputting probe light, an optical multiplexer 25 for multiplexing the probe light and the optical signal output from the modulator and selectively outputting the multiplexed light to an input terminal of an optical fiber amplifier 5 as an object to be measured, optical path switching means 28 and 33 for switching connection states of the input terminal and an output terminal of the optical fiber amplifier, a second optical modulator 35 for extracting the signal light switched by the optical path switching means and output from the output terminal of the optical fiber amplifier, a controller 40 for controlling the first optical modulator, the second optical modulator, and the optical path switching means, and an analyzing means 38 for obtaining the light intensity in a region where the output signal light from the optical fiber amplifier is in an OFF period and the probe light is output, the light intensity in a region where the signal light is in the OFF period and no probe light is output, and the light intensity of an input signal of the probe light to the optical fiber amplifier, thereby obtaining the gain and noise figure as the wavelength characteristics of the optical fiber amplifier from these light intensities.

As described above, the third invention comprises:

(1) the first light source 1 for outputting signal light, (2) the first optical modulator 23 for modulating the signal light into a rectangular optical signal which is turned on and off at predetermined periods, (3) the second light source 2 for outputting probe light, (4) the optical multiplexer 25 for multiplexing the probe light and the optical signal output from the modulator and selectively outputting the multiplexed light to the input terminal of the optical fiber amplifier 5 as an object to be measured, (5) the optical path switches 28 and 33 for switching connection states of the input terminal and the output terminal of the optical fiber amplifier, (6) the second optical modulator 35 for extracting the signal light switched by the optical path switching means and output from the output terminal of the optical fiber amplifier, (7) the controller 40 for controlling the first optical modulator, the second optical modulator, and the optical path switching means, and (8) the analyzing means 38 for obtaining the light intensity in a region where the output signal light from the optical fiber amplifier is in the OFF period and the probe light is output, the light intensity in a region where the signal light is in the OFF period and no probe light is output, and the light intensity of an input signal of the probe light to the optical fiber amplifier, thereby obtaining the gain and noise figure as the wavelength characteristics of the optical fiber amplifier from these light intensities.

An optical amplifier evaluating apparatus according to the fourth invention comprises, in addition to the optical amplifier evaluating apparatus according to the third invention, a third optical modulator 52 for modulating the probe light output from the second light source into a rectangular optical signal which is turned on and off at predetermined periods, between the second light source 2 and the optical multiplexer 25.

In addition to the above methods and means, the present invention can also include methods or means described in items (1) to (8) below:

(1) The second light source is a light source having a wide output band and almost flat wavelength characteristics, e.g., an SLD, EELED, white light source, or amplified spontaneous emission (ASE) of an optical fiber amplifier.

(2) The second light source uses a variable-wavelength light source to sweep the wavelength and synchronizes with the optical spectrum analyzer.

(3) The first light source is a variable-wavelength light source.

(4) An optical attenuator is also included which can adjust at least one of the output light components from the first and second light sources to a desired optical output level.

(5) At least one of the first and second light sources includes an optical attenuator and thereby can be adjusted to a desired optical output level.

(6) The gain and noise figure as the wavelength characteristics are obtained by using two or more waves as the first light source.

(7) The optical attenuator has a shutter and can shut off input light.

(8) The optical path switches are controlled to form an optical path from the second light source to the optical fiber amplifier and an optical path from the optical fiber amplifier to the light intensity measurement position. Output light from the optical fiber amplifier in a no-input state is passed through these optical paths to obtain the optical losses in the optical paths. From these optical losses, each light intensity is corrected.

Accordingly, the present invention can accurately evaluate the wavelength characteristics of an optical amplifier with a simple arrangement in comparison to the prior art.

Embodiments of the present invention based on the aforementioned outline will be described below with reference to the accompanying drawings.

(First Embodiment)

FIG. 1 is a block diagram showing an outline of the arrangement of an optical amplifier evaluating apparatus according to the first embodiment of the present invention.

As shown in FIG. 1, signal light emitted by a first light source 1 is attenuated to a desired signal level by a first optical attenuator 50 and input to a first optical modulator 23 via an input terminal 22 of an optical modulation unit 21.

Figure 2:
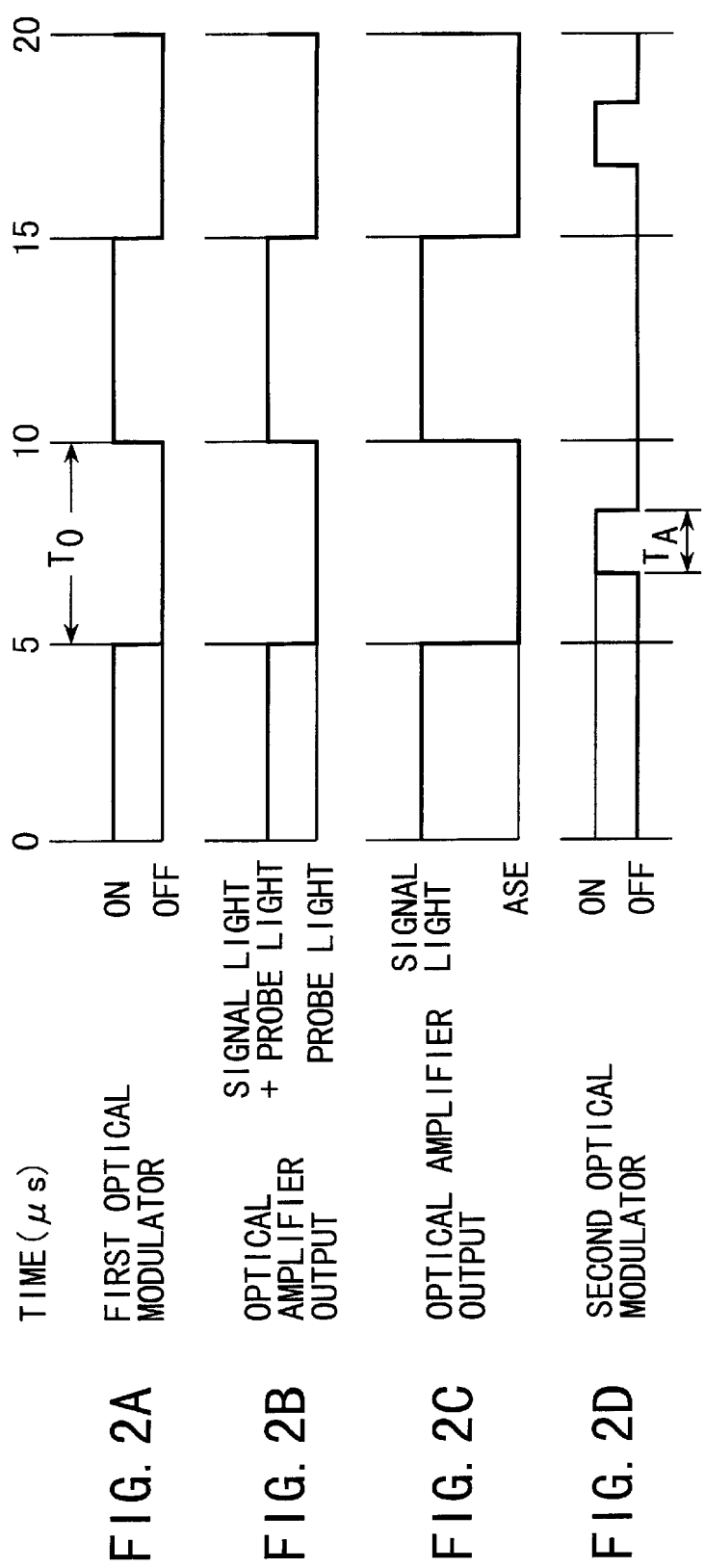
FIGS. 2A to 2D are timing charts showing the light intensity measuring operation of the optical amplifier evaluating apparatus according to the first embodiment of the present invention.

As shown in FIG. 2A of the timing charts of FIGS. 2A to 2D, this first optical modulator 23 modulates the signal light from the first optical modulator 23 into rectangular optical signal which is turned on and off at a predetermined period T0 (e.g., 5 $\mu$s) much shorter than the response time (the time that rare earth element light of metastable erbium doped in the core of an optical fiber of an optical fiber amplifier requires to recover to the ground state) of amplified spontaneous emission ASE of an optical fiber amplifier 5, and feeds this optical signal into an optical multiplexer 25 via a terminal 24.

Like the signal light emitted by the first light source 1, probe light emitted by a second light source 2 is attenuated to a desired optical level by a second optical attenuator 51 and fed into the optical multiplexer 25 via an input terminal 26 of the optical modulation unit 21.

The optical signal multiplexed by this optical multiplexer 25 is input to the first terminal of a first optical path switch 28 via a terminal 27.

This first optical path switch 28 has a total of four terminals from the first to fourth terminals. In normal state, as indicated by the solid lines in FIG. 1, the first and second terminals are connected, and the third and fourth terminals are connected (this state will be referred to as a steady state hereinafter).

In accordance with a switching command from a controller 40, the first optical path switch 28 transits to a switched state in which, as indicated by the dotted lines in FIG. 1, the first and fourth terminals are connected, and the second and third terminals are open.

That is, in accordance with commands from the controller 40 the first optical path switch 28 can take the two different states; the steady state indicated by the solid lines in FIG. 1, and the switched state indicated by the dotted lines.

The signal light and the probe light passed through the first and second terminals of the first optical path switch 28 in the steady state are fed into the input terminal of the optical fiber amplifier 5 via an output terminal 29 of the optical modulation unit 21.

The amplified optical signal output from the output terminal of the optical fiber amplifier 28 is input to the third terminal of the first optical path switch 28 via an input terminal 30 of the optical modulation unit 21.

The optical signal input to the third terminal of the first optical switch 28 in the steady state is fed into the first terminal of a second optical path switch 33, having the same configuration as the first optical path switch 28, via the fourth terminal and a terminal 32.

The incoming optical signal to the first terminal of this second optical path switch 33 is fed into a second optical modulator 35 via the second terminal and a terminal 34.

This second optical modulator 35 is, e.g., an optical modulator using an acoustic optical element and has a high response speed with which the ON-OFF leading and trailing edge times are a few $\mu$s or less, much shorter than the response time (the time that rare earth element of metastable erbium doped in the core of an optical fiber of the optical fiber amplifier requires to recover to the ground state) of the amplified spontaneous emission ASE of the optical fiber amplifier. In addition, this optical modulator has a high extinction ratio (the ratio of ON insertion loss to OFF insertion loss) of, e.g., 60 dB or more so as to prevent measurement errors resulting from leakage light intensity in an OFF period.

As shown in FIG. 2D of the timing charts in FIGS. 2A to 2D, this second optical modulator has a function of passing the optical signal only for a partial period TA of the OFF period of the output signal emitted from the optical fiber amplifier 5.

Also, the modulated optical signal output from the second optical modulator 35 is input to the third terminal of the second optical path switch 33 in the steady state via a terminal 36.

The input optical signal to the third terminal of the second optical path switch 33 is fed into an optical spectrum analyzer 38 via the fourth terminal and an output terminal 37 of the optical modulation unit 21.

This optical spectrum analyzer 38 analyzes the spectrum of the output optical signal from the output terminal 37 of the optical modulation unit 21 and obtains the light intensity at each wavelength ($\lambda$) or each frequency ($\nu$).

The VBW (the frequency band width of an internal light-receiving amplifier) of the optical spectrum analyzer 38 is set at a few hundred Hz, much lower than the modulation frequency (the reciprocal of the ON-OFF period) of the second optical modulator 35. The optical spectrum analyzer 38 measures the time-average value of spectrum.

As described previously, the controller 40 ON/OFF-controls the first optical modulator 23 and the second optical modulator 35.

The controller 40 also controls switching between the steady state and the switched state of the first optical path switch 28 and the second optical path switch 33 of the optical modulation unit 21, controls to close/open the shutter of the first optical attenuator 50 and the second optical attenuator 51, and adjusts the level of an optical signal.

Additionally, the controller 40 calculates a gain G and noise figure NF as the wavelength characteristics of the optical fiber amplifier 5 by using the light intensity of each optical signal measured by the optical spectrum analyzer 38.

Practical procedures of obtaining the gain G and noise figure NF as the wavelength characteristics of the optical fiber amplifier by using the optical amplifier evaluating apparatus with the above arrangement will be explained below in order.

(Measurement of Probe Light Input Intensity PIN to Optical Fiber Amplifier 5)

To measure probe light intensity PIN alone, the controller 40 sends to the first optical attenuator 50 a command for closing its shutter to prevent input of the saturated signal light (the first light source 1) to the optical spectrum analyzer 38.

Also, the controller 40 opens the shutter of the second optical attenuator 51 and adjusts the attenuation amount of the second optical attenuator 51, thereby adjusting the intensity of the probe light (the second light source 2) to a desired intensity.

Furthermore, the controller 40 sets the first optical path switch 28 and the second optical path switch 33 in the switched state indicated by the dotted lines in FIG. 1, and sends a light intensity measurement command to the optical spectrum analyzer 38.

The optical spectrum analyzer 38 analyzes the spectrum of this incoming light and obtains a light intensity PINM at each wavelength.

The optical spectrum analyzer 38 sends the measured light intensity PINM to the controller 40.

The controller 40 corrects the measured light intensity PINM by the method (to be described later) of calibrating the optical loss in each optical path, thereby obtaining accurate input light intensity PIN of the probe light to the optical fiber amplifier 5.

(Measurement of Probe Light Output Intensity POUT from Optical Fiber Amplifier 5)

First, the controller 40 opens the shutter of the first optical attenuator 50 to pass the signal light from the first light source 1 and adjusts this signal light to a desired light intensity.

Also, the controller 40 opens the shutter of the second optical attenuator 51 to pass the probe light from the second light source 2 and adjusts this probe light to a desired light intensity.

Furthermore, the controller 40 sets the first optical path switch 28 and the second optical path switch 33 in the steady state indicated by the solid lines in FIG. 1.

Then the controller 40 sends a light intensity measurement command to the optical spectrum analyzer 38.

In this state, as shown in FIG. 2A of the timing charts in FIGS. 2A to 2D, the first optical modulator 23 modulates the signal light output from the first light source 1 into a rectangular optical signal which is turned on and off at the predetermined period T0.

The optical multiplexer 25 multiplexes the optical signal modulated by this first optical modulator 23 and the probe light output from the second light source 2, and feeds the multiplexed optical signal into the optical fiber amplifier 5 as an object to be measured where the signal is optically amplified.

The amplified optical signal output from this optical fiber amplifier 5 is fed into the second optical modulator 35 via the first optical path switch 28 and the second optical path switch 33.

As shown in FIG. 2D of the timing charts in FIGS. 2A to 2D, this second optical modulator 35 extracts, from the input amplified optical signal, only the partial period TA of the OFF period of the signal light from the first light source 1, i.e., the amplified probe signal light (the second light source 2), and feeds this optical signal into the optical spectrum analyzer 38 via the second optical path switch 33.

The optical spectrum analyzer 38 measures POUTM of the spectrum of the input optical signal (the sum signal of the amplified probe signal light (the second light source 2) and the amplified spontaneous emission from the optical fiber amplifier 5), and sends the measured POUTM to the controller 40.

The controller 40 corrects the measured POUTM by the method (to be described later) of calibrating the optical loss in each optical path and obtains an accurate intensity POUT of the optical signal (the sum signal of the amplified probe signal light (the second light source 2) and the amplified spontaneous emission from the optical fiber amplifier 5).

(Measurement of Amplified Spontaneous Emission Output Intensity PASE from Optical Fiber Amplifier 5)

First, the controller 40 opens the shutter of the first optical attenuator 50 to pass the signal light from the first light source 1, closes the shutter of the second optical attenuator 51 to shut off the probe light from the second light source 2, and sets the first optical path switch 28 and the second optical path switch 33 in the steady state indicated by the solid lines in FIG. 1.

The controller 40 sends a light intensity measurement command to the optical spectrum analyzer 38.

In this state, the first optical modulator 23 modulates the signal light emitted by the first light source 1 into a rectangular optical signal which is turned on and off at the predetermined period T0 as shown in FIG. 2A.

The optical signal modulated by this first optical modulator 23 is fed into the optical fiber amplifier 5 and optically amplified.

The amplified optical signal output from the optical fiber amplifier 5 is fed into the second optical modulator 35 via the first optical path switch 28 and the second optical path switch 33.

The second optical modulator 35 extracts a partial period TA of the OFF period of the incoming optical signal and feeds the extracted optical signal into the optical spectrum analyzer 38 via the second optical path switch 33.

The optical spectrum analyzer 38 measures the spectrum of the incoming optical signal (the amplified spontaneous emission from the optical fiber amplifier 5) as PASEM and sends this PASEM to the controller 40.

This controller 40 corrects the measured PASEM by the method (to be described below) of calibrating the optical loss in each optical path and obtains an accurate intensity PASE of the optical signal (the amplified spontaneous emission from the optical fiber amplifier 5).

(Calibration of Optical Loss in Each Optical Path)

(1) Measurement of Reference Light Intensity Pref and Calibration of Resolution Width First, reference light intensity Pref of reference light used to measure the optical loss in each optical path through which each optical signal passes in the optical modulation unit 21 is obtained.

Figure 3:
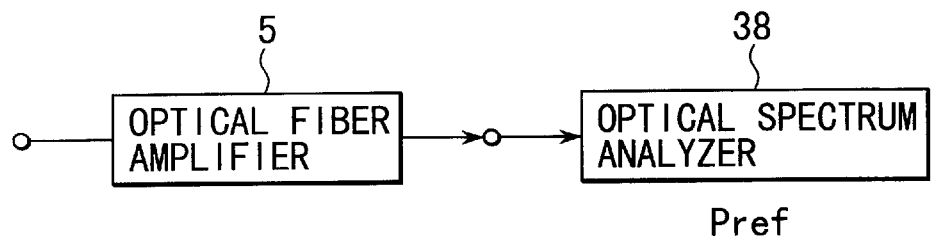
FIG. 3 is a connection diagram for explaining a light intensity calibrating method in an optical amplifier evaluating method according to the first embodiment of the present invention.

That is, as shown in FIG. 3, the optical spectrum analyzer 38 is directly connected to the output terminal of the optical fiber amplifier 5 as an object to be measured in a no-input state. The optical spectrum analyzer 38 analyzes the spectrum of output light which is emitted, owing to the aforementioned amplified spontaneous emission, as reference light from the optical fiber amplifier 5 in this no-input state, thereby measuring the reference light intensity Pref at each wavelength $\lambda$.

The output reference light from this optical fiber amplifier 5 has no polarization component, because this reference light results from the amplified spontaneous emission, and also has almost flat wavelength characteristics.

(2) Measurement of Loss Lap in Optical Path from Input Terminal 26 to Output Terminal 29

Figure 4:
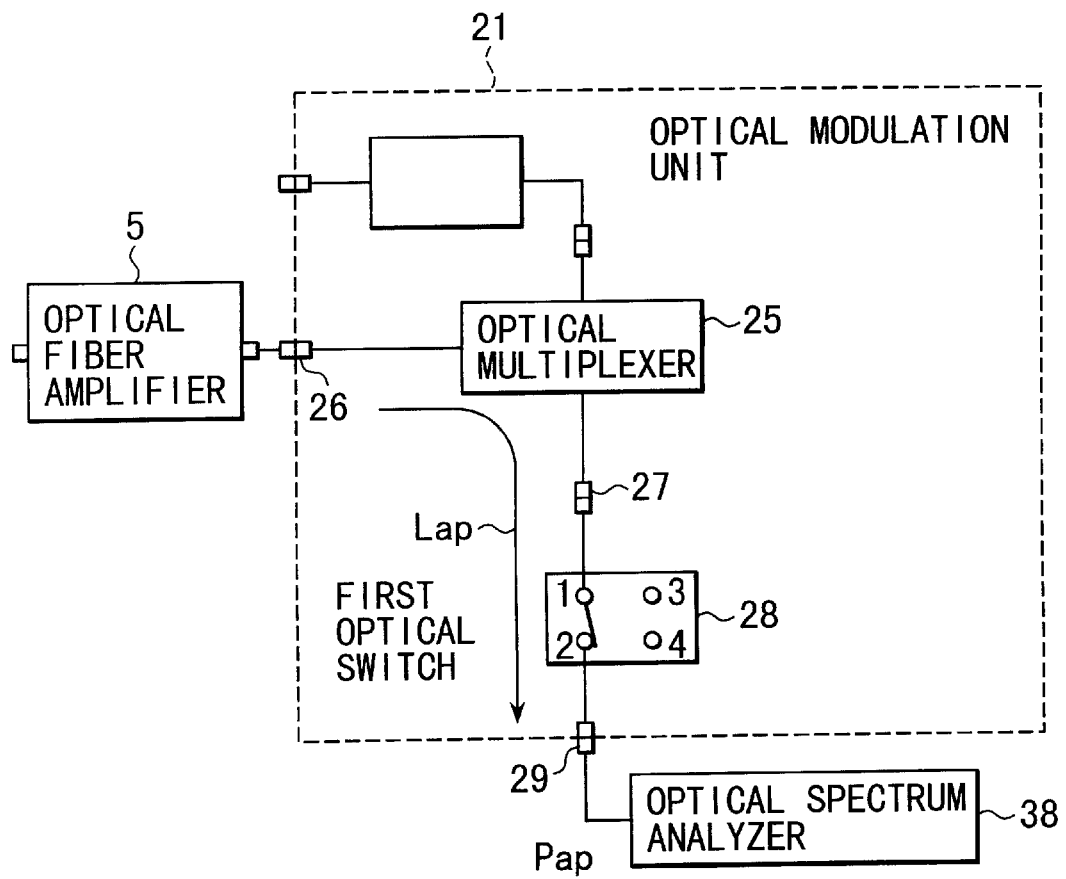
FIG. 4 is a view showing a method of measuring optical loss in an optical path in the amplifier evaluating method according to the first embodiment of the present invention.

As shown in FIG. 4, the output light from the optical fiber amplifier 5 in a no-input state is applied to the input terminal 26 of the optical modulation unit 21.

The controller 40 is operated to set the first optical path switch 28 in the steady state.

The output terminal 29 of the optical modulation unit 21 is then connected to the optical spectrum analyzer 38 to measure a light intensity Pap($\lambda$) at each wavelength $\lambda$ of the optical signal that is output from the optical fiber amplifier 5 and passed through the optical path including the optical multiplexer 25 and the first optical path switch 28.

Since the light intensity Pref($\lambda$) of the output reference light from the optical fiber amplifier 5 is already measured, optical loss Lap($\lambda$) in this optical path is calculated by $$Lap(\lambda)=Pap(\lambda)/Pref(\lambda) \qquad (3)$$

(3) Measurement of Loss Ldp in Optical Path from Input Terminal 26 to Output Terminal 37

Figure 5:
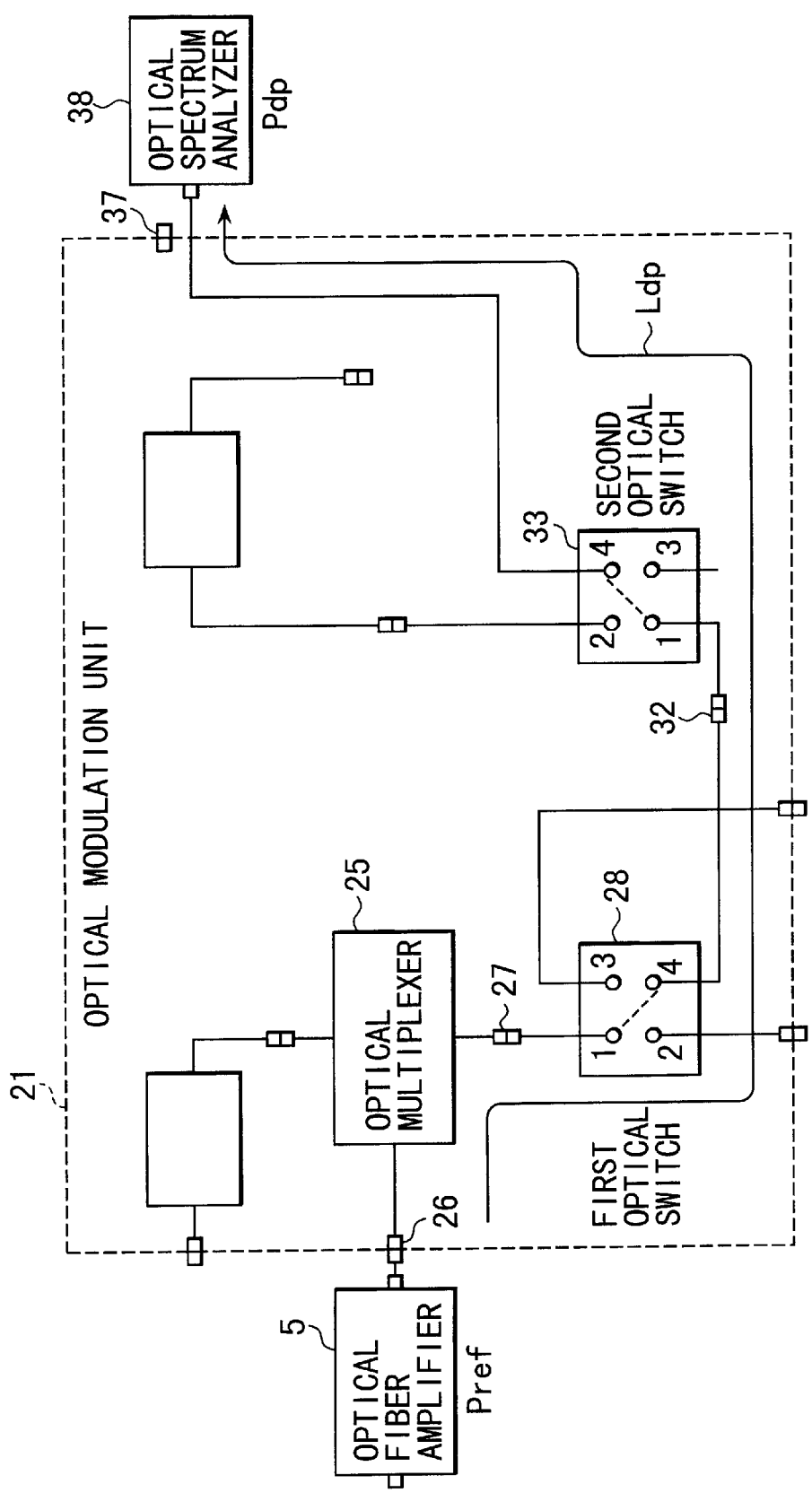
FIG. 5 is a view showing a method of measuring optical loss in an optical path in the optical amplifier evaluating method according to the first embodiment of the present invention.

As shown in FIG. 5, the output light from the optical fiber amplifier 5 in a no-input state is applied to the input terminal 26 of the optical modulation unit 21.

The controller 40 is operated to set the first optical path switch 28 and the second optical path switch 33 in the steady state.

The output terminal 37 of the optical modulation unit 21 is then connected to the optical spectrum analyzer 38 to measure a light intensity Pdp($\lambda$) at each wavelength $\lambda$ of the optical signal that is output from the optical fiber amplifier 5 and passed through the optical path including the optical multiplexer 25, the first optical path switch 28, and the second optical path switch 33.

Since the light intensity Pref($\lambda$) of the output reference light from the optical fiber amplifier 5 is already measured, an optical loss Ldp($\lambda$) in this optical path is calculated by $$Ldp(\lambda)=Pdp(\lambda)/Pref(\lambda) \qquad (4)$$

(4) Measurement of Loss Lb in Optical Path from Input Terminal 30 to Output Terminal 37

Figure 6:
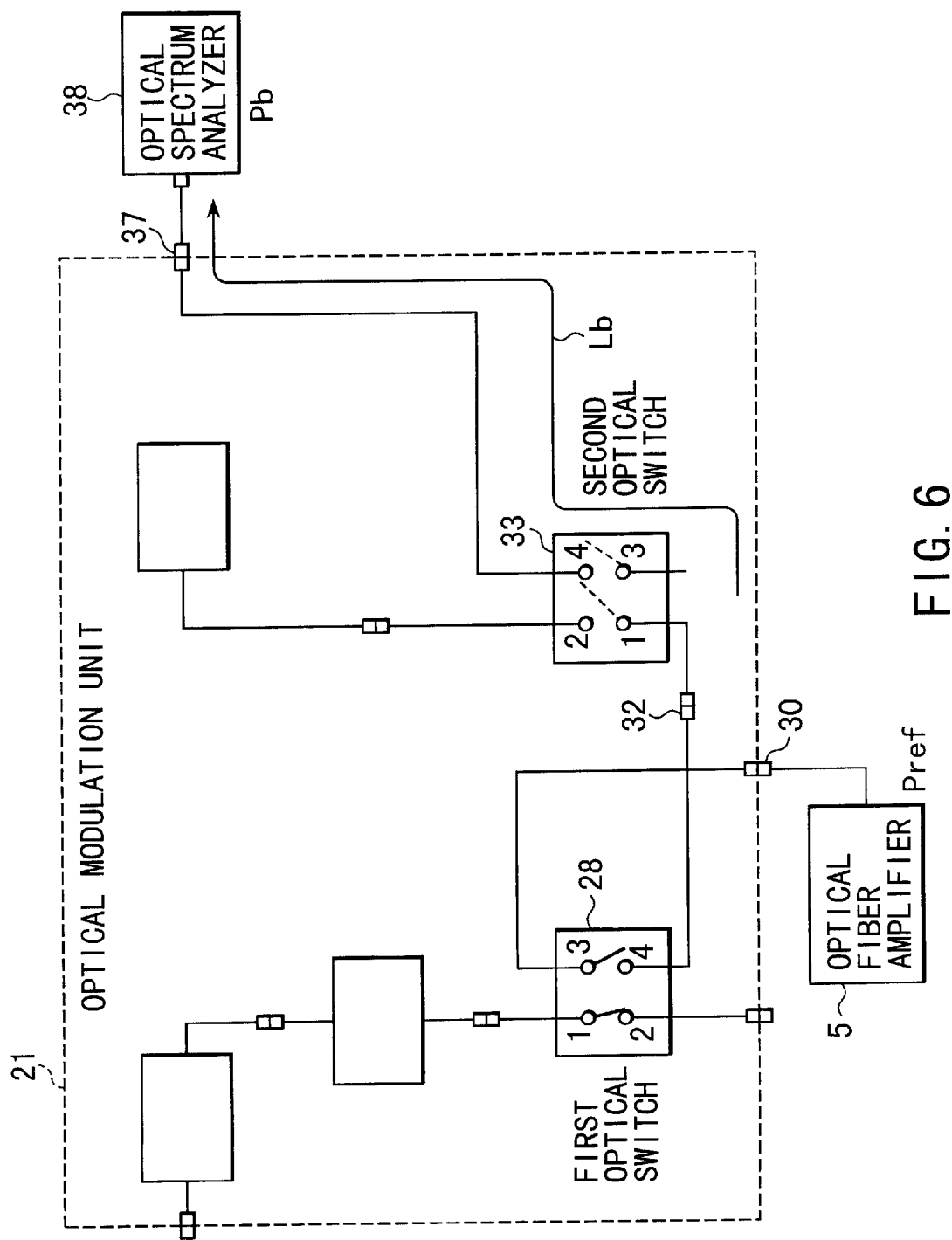
FIG. 6 is a view showing a method of measuring optical loss in an optical path in the amplifier evaluating method according to the first embodiment of the present invention.

As shown in FIG. 6, the output light from the optical fiber amplifier 5 in a no-input state is applied to the input terminal 30 of the optical modulation unit 21.

The controller 40 is operated to set the first optical path switch 28 in the steady state and the second optical path switch 33 in the switched state.

The output terminal 37 of the optical modulation unit 21 is then connected to the optical spectrum analyzer 38 to measure a light intensity Pb($\lambda$) at each wavelength $\lambda$ of the optical signal that is output from the optical fiber amplifier 5 and passed through the optical path including the first optical path switch 28 and the second optical path switch 33.

Since the light intensity Pref($\lambda$) of the output reference light from the optical fiber amplifier 5 is already measured, an optical loss Lb($\lambda$) in this optical path is calculated by $$Lb(\lambda)=Pd(\lambda)/Pref(\lambda) \qquad (5)$$

(5) Measurement of Loss Lc in Optical Path from Input Terminal 30 to Output Terminal 37

Figure 7:
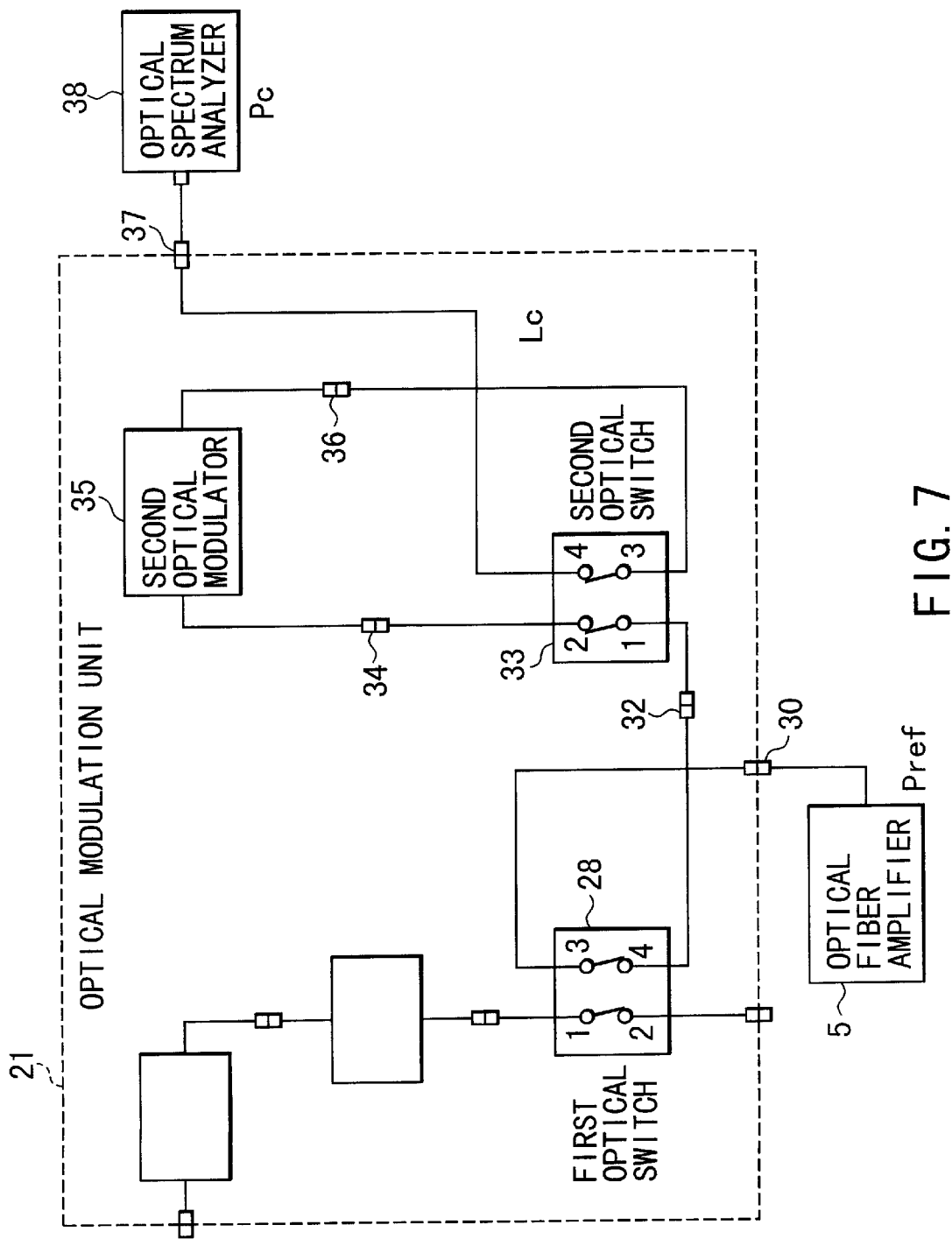
FIG. 7 is a view showing a method of measuring optical loss in an optical path in the optical amplifier evaluating method according to the first embodiment of the present invention.

As shown in FIG. 7, the output light from the optical fiber amplifier 5 in a no-input state is applied to the input terminal 30 of the optical modulation unit 21.

The controller 40 is operated to set the first optical path switch 28 and the second optical path switch 33 in the steady state.

The output terminal 37 of the optical modulation unit 21 is then connected to the optical spectrum analyzer 38 to measure a light intensity Pc($\lambda$) at each wavelength $\lambda$ of the optical signal that is output from the optical fiber amplifier 5 and passed through the optical path including the first optical path switch 28, the second optical path switch 33, and the second optical modulator 35.

Since the light intensity Pref($\lambda$) of the output reference light from the optical fiber amplifier 5 is already measured, an optical loss Lc($\lambda$) in this optical path is calculated by $$Lc(\lambda)=Pc(\lambda)/Pref(\lambda) \qquad (6)$$

Through processes (1) to (5) described above, the measurements of the optical losses Lap($\lambda$), Lb($\lambda$), Lc($\lambda$), and Ldp($\lambda$) in the optical paths formed in the optical modulation unit 21 are completed.

These optical losses Lap($\lambda$) to Ldp($\lambda$) in the optical paths thus measured are stored in the controller 40.

Measurements of the gain G and noise figure NF of the optical fiber amplifier 5 as an object to be measured are performed following the procedures below.

Note that measurement and calculation processes of the gain G and noise figure NF are automatically performed in accordance with the control program of the controller 40.

The controller 40 corrects the measured light intensity PINM(λ) in accordance with equation (7) below by using the previously measured optical losses Ldp(λ) and Lap(λ), thereby calculating correct input light intensity PIN(λ) with respect to the optical fiber amplifier 5:

$$PIN(\lambda) = PINM(\lambda) \cdot Lap(\lambda)/Ldp(\lambda) \quad (7)$$

Analogously, the controller 40 corrects the measured POUT(λ) in accordance with equation (8) below by using the previously measured optical loss Lb(λ), thereby calculating a correct output light intensity POUT(λ) with respect to the optical fiber amplifier 5:

$$POUT(\lambda) = POUTM(\lambda)/Lb(\lambda) \quad (8)$$

Also, the controller 40 corrects the measured PASEM(λ) in accordance with equation (9) below by using the previously measured optical loss Lc(λ), thereby calculating a correct light intensity PASE(λ) of the amplified spontaneous emission (ASE) with respect to the optical fiber amplifier 5:

$$PASE(\lambda) = PASEM(\lambda)/Lc(\lambda) \quad (9)$$

(Calculations of Gain G and Noise Figure NF of Optical Fiber Amplifier 5)

By using the input light intensity PIN, the output intensity POUT, and the light intensity PASE of the amplified spontaneous emission (ASE) thus corrected, the controller 40 calculates the gain G and noise figure NF of the optical fiber amplifier 5 in accordance with $$G = (POUT - PASE)/PIN \quad (10)$$

$$NF = f(G, PASE, \nu, \Delta\nu) \quad (11)$$

In the optical amplifier evaluating apparatus according to the first embodiment of the present invention with the above arrangement, the pulse method using optical modulators is combined with the probe method which uses, as probe light, a light source having a wide band and almost flat wavelength characteristics, e.g., an SLD, EELED, white light source, or amplified spontaneous emission (ASE). In addition, the controller 40 automatically (1) controls opening/closing of the shutters and sets the attenuation amounts of the first optical attenuator 50 and the second optical attenuator 51, (2) switches the first optical path switch 28 and the second optical path switch 33, (3) instructs the optical spectrum analyzer to measure each light intensity, (4) corrects the measured light intensity, and (5) finally calculates the gain G and noise figure NF of the optical fiber amplifier 5. Consequently, the gain G and noise figure NF as the wavelength characteristics of the optical fiber amplifier 5 can be simply and accurately measured.

(Second Embodiment)

Figure 8:
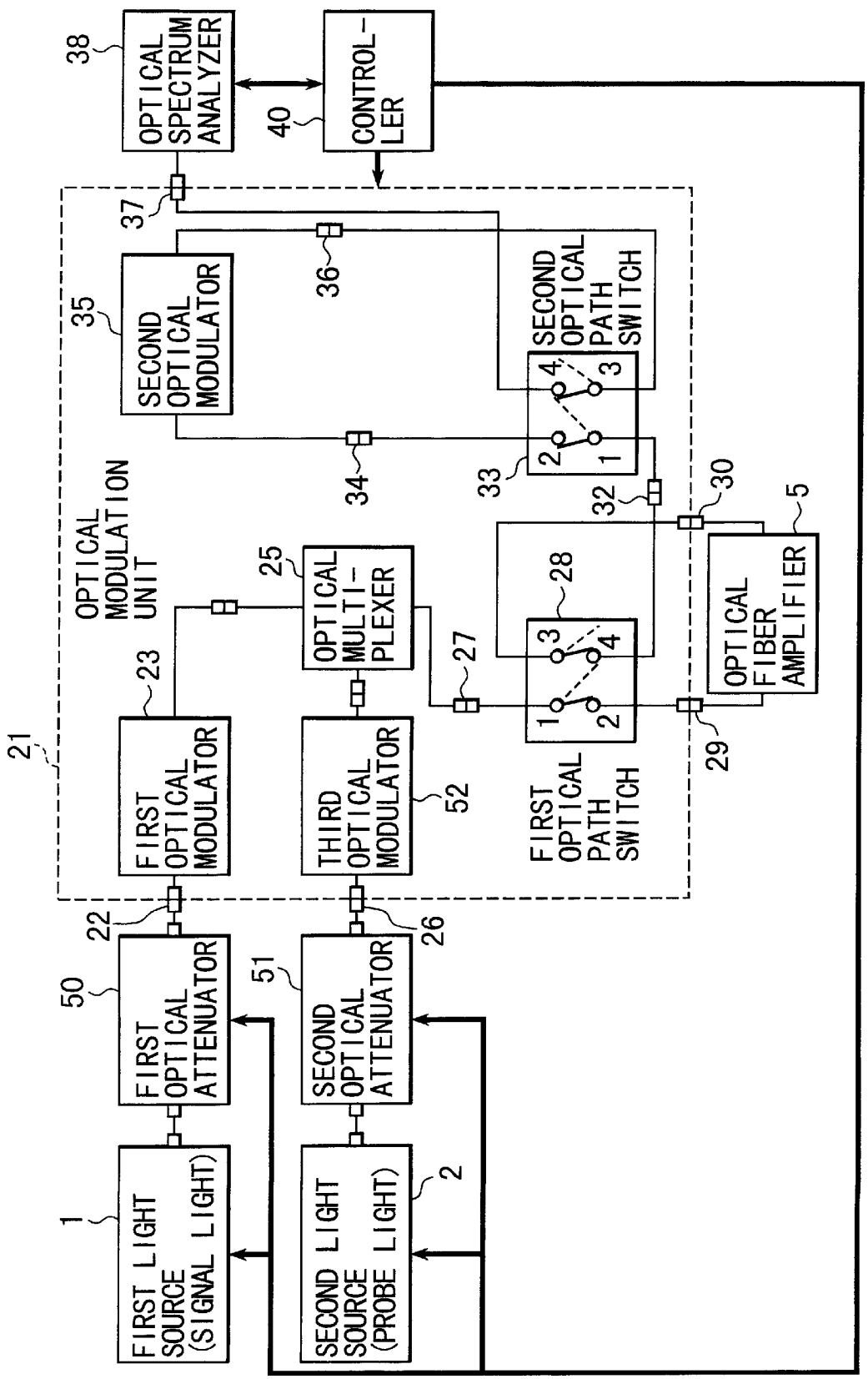
FIG. 8 is a block diagram showing an outline of the arrangement of an optical amplifier evaluating apparatus according to the second embodiment of the present invention.

FIG. 8 is a block diagram showing an outline of the arrangement of an optical amplifier evaluating apparatus according to the second embodiment of the present invention.

In FIG. 8, the same reference numerals as in the optical amplifier evaluating apparatus according to the first embodiment shown in FIG. 1 denote the same parts, and a detailed description thereof will be omitted.

An optical modulation unit of the optical amplifier evaluating apparatus of this second embodiment incorporates a third optical modulator 52 between an input terminal 26 of an optical modulation unit 21 and an optical multiplexer 25 shown in FIG. 1.

Figure 9:
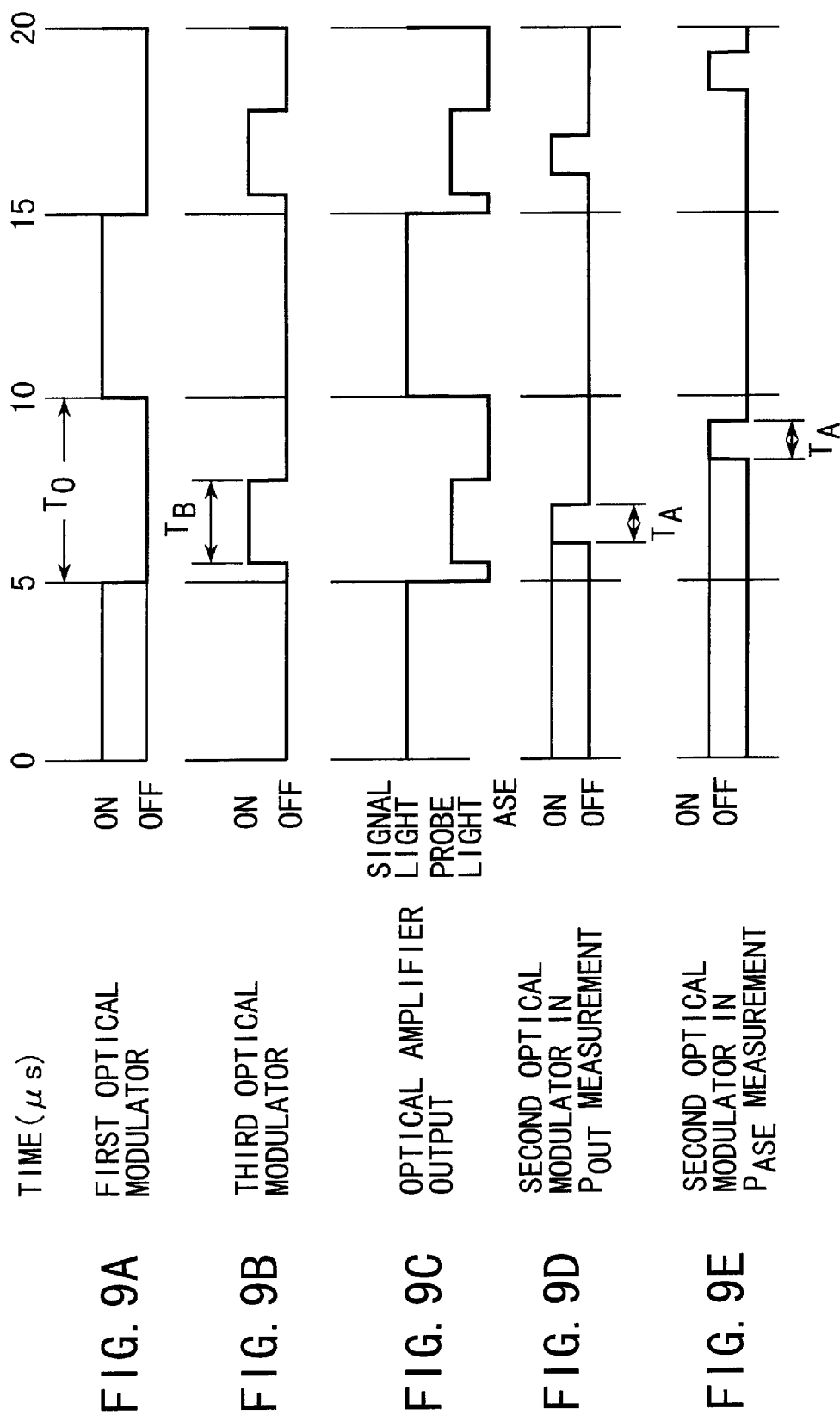
FIGS. 9A to 9E are timing charts showing the light intensity measuring operation of the optical amplifier evaluating apparatus according to the second embodiment of the present invention.
Figure 10:
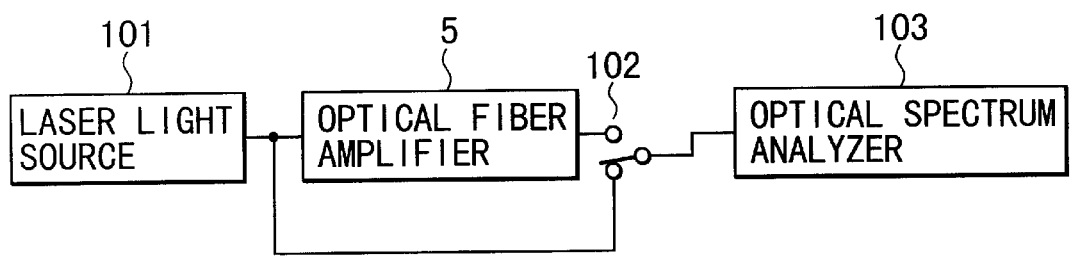
FIG. 10 is a view showing a conventional method of evaluating an optical fiber amplifier.
Figure 11:
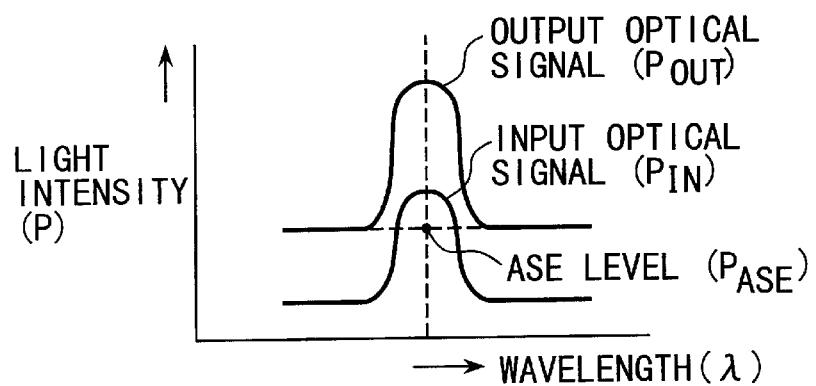
FIG. 11 is a graph showing the relationship between the light intensities of input light, output light, and amplified spontaneous emission in a fiber amplifier.
Figure 12:
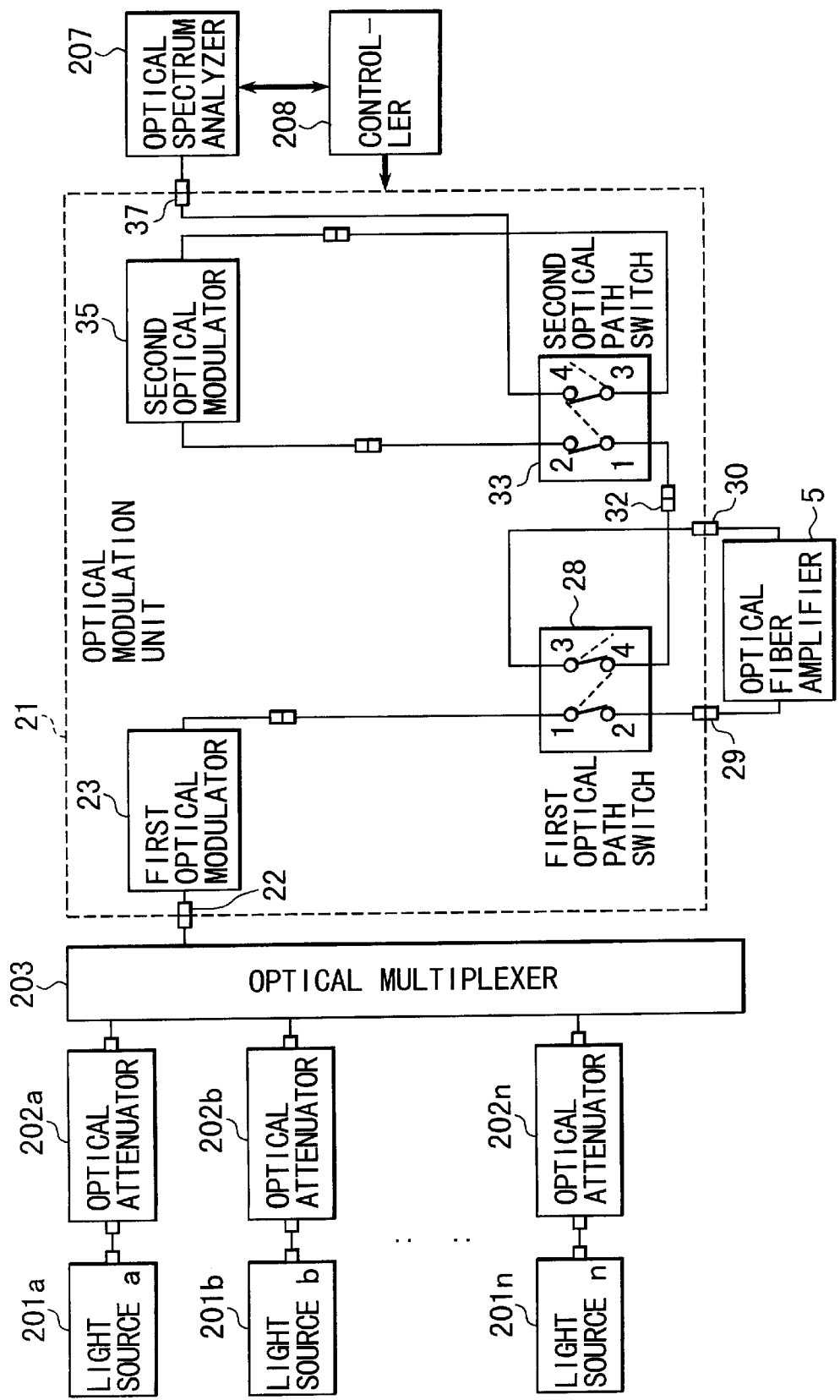
FIG. 12 is a block diagram showing an outline of the arrangement of an optical amplifier evaluating apparatus using a conventional pulse method.
Figure 13:
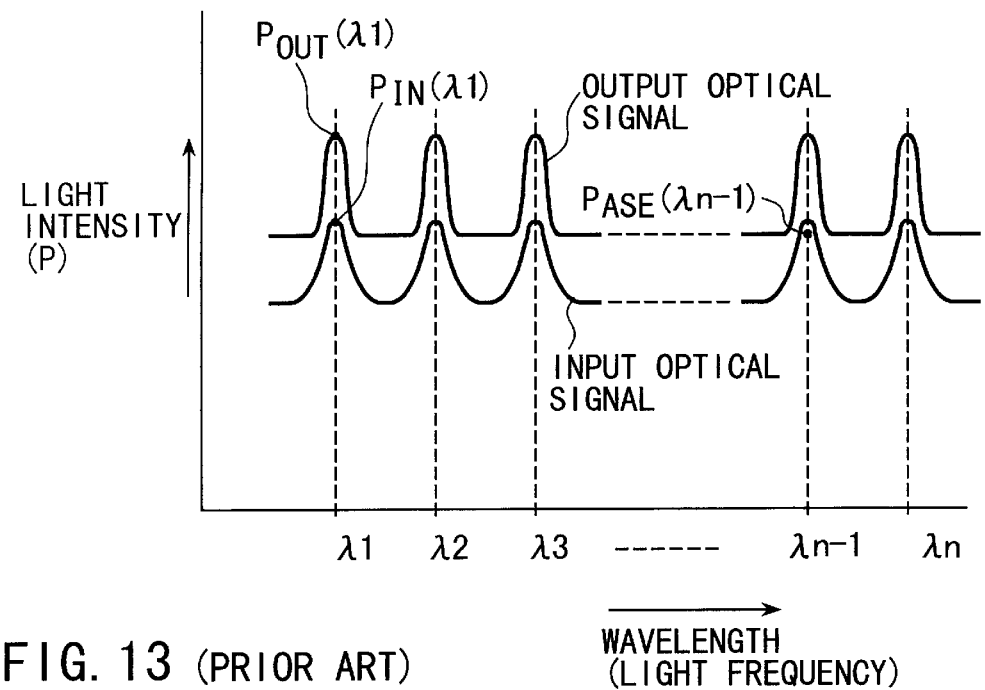
FIG. 13 is a graph showing the relationship between the light intensities of input light, output light, and amplified spontaneous emission in a conventional fiber amplifier.
Figure 15A:
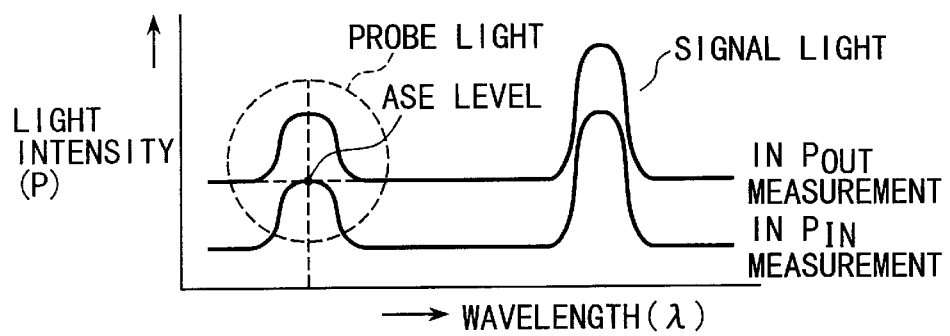
FIGS. 15A and 15B are graphs showing the relationship between the light intensities of input light, output light, and amplified spontaneous emission in a conventional fiber amplifier.
Figure 15B:
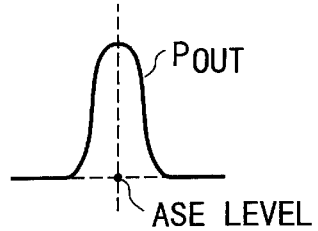
Figure 14:
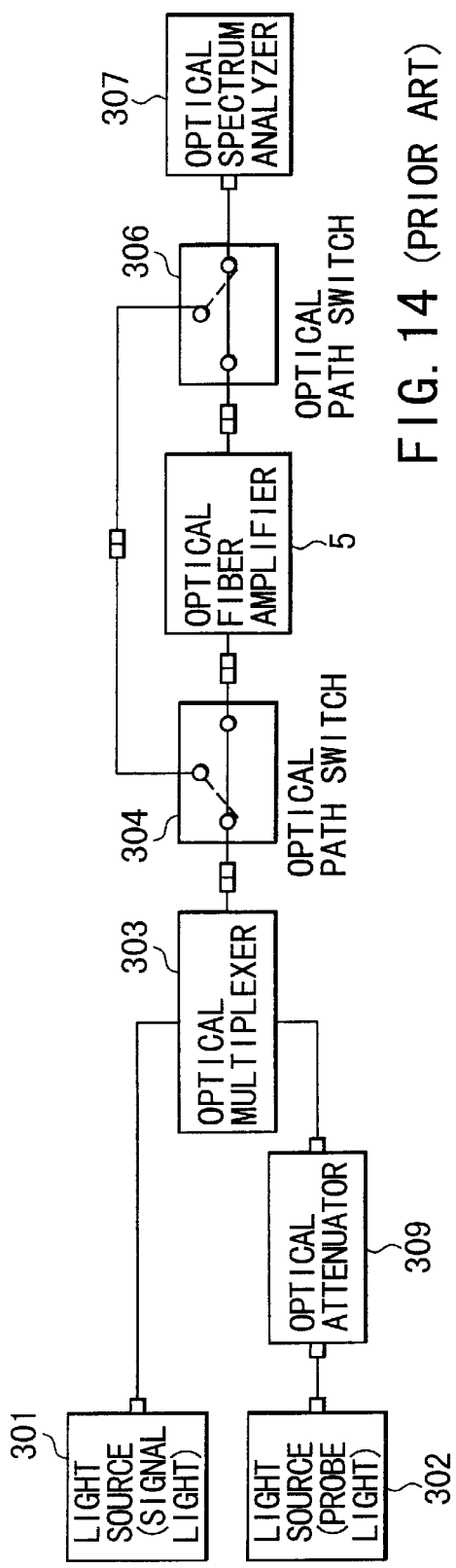
FIG. 14 is a block diagram showing an outline of an optical amplifier evaluating apparatus using a conventional probe method.
Figure 16:
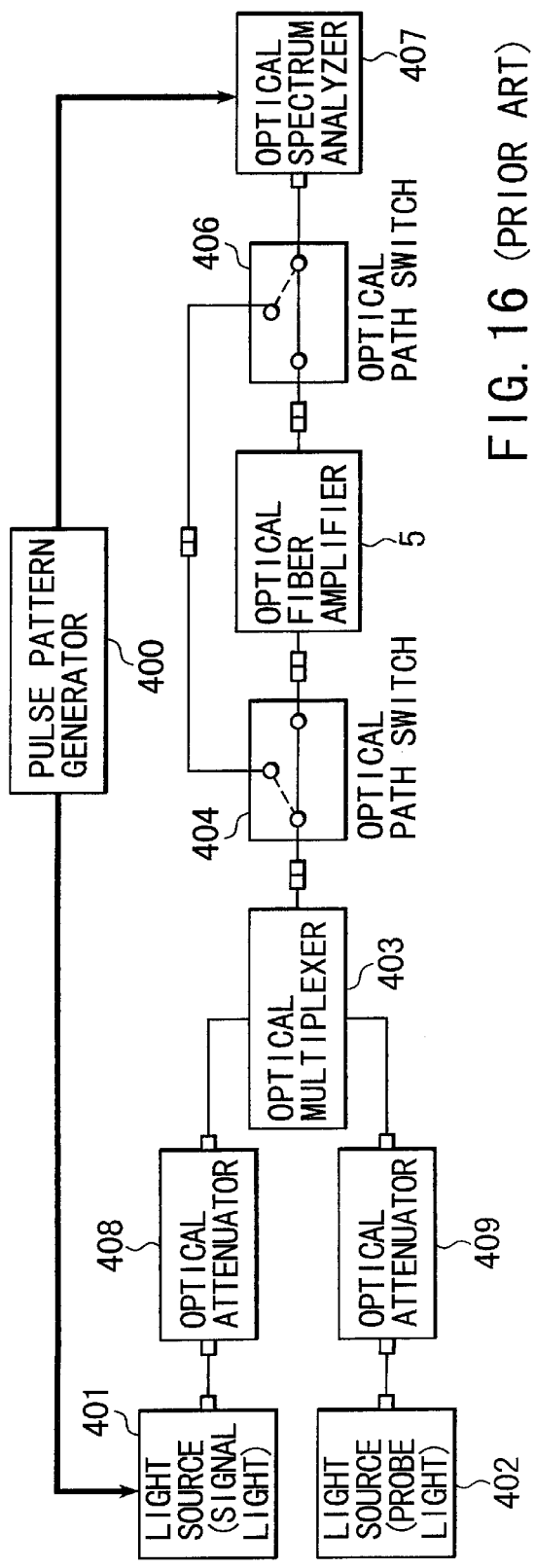
FIG. 16 is a view showing an optical amplifier evaluating apparatus combining the conventional pulse method and probe method.

This third optical modulator 52 converts probe light, emitted by a second light source 2 and passed through a second optical attenuator 51, into a rectangular optical signal which is turned on and off at a predetermined period TB as shown in FIG. 9B of the timing charts shown in FIGS. 9A to 9E. This optical signal is multiplexed, via a terminal 53, with signal light by the optical multiplexer 25.

Practical procedures of obtaining a gain G and noise figure NF as the wavelength characteristics of an optical fiber amplifier 5 by using the optical amplifier evaluating apparatus with the above arrangement will be explained below in order.

Note that PIN measurements and calculations of the gain G and the noise figure NF already explained in the first embodiment will be omitted.

Note also that since the third modulator 52 is incorporated, calibrations of an optical loss Lap in the optical path from the input terminal 26 to an output terminal 29 and an optical loss Ldp in the optical path from the input terminal 26 to an output terminal 37 are different from the first embodiment, but the measurement method itself is the same as in the first embodiment.

(Measurement of Probe Light Output Intensity POUT from Optical Fiber Amplifier 5)

First, a controller 40 allows a shutter of a first optical attenuator 50 to transmit signal light from a first light source 1 and adjusts this signal light to a desired light intensity.

Similarly, the controller 40 allows a shutter of the second optical attenuator 51 to transmit probe light from the second light source 2 and adjusts this probe light to a desired light intensity.

Additionally, the controller 40 sets a first optical path switch 28 and a second optical path switch 33 in a steady state indicated by the solid lines in FIG. 8, and also sends a light intensity measurement command to an optical spectrum analyzer 38.

In this state, a first optical modulator 23 modulates the signal light emitted by the first light source 1 into a rectangular optical signal which, as shown in FIG. 9A, is turned on and off at a predetermined period T0.

Analogously, the third optical modulator 52 modulates the probe light emitted by the second light source 2 into a rectangular optical signal which, as shown in FIG. 9B, is turned on and off at the predetermined period TB.

The optical multiplexer 25 multiplexes these optical signals modulated at the predetermined periods T0 and TB as described above and supplies the multiplexed signal to the optical fiber amplifier 5 where the signal is optically amplified.

The amplified optical signal output from this optical fiber amplifier 5 is fed into a second optical modulator 35 via the first optical path switch 28 and the second optical path switch 33.

As shown in FIG. 6, this second optical modulator 35 extracts an optical output in a partial period TA of the OFF period of the input amplified signal light and in the ON period TB of the probe light. The second optical modulator 35 supplies the extracted optical output to the optical spectrum analyzer 38 via the second optical path switch 33.

This optical spectrum analyzer 38 analyzes the spectrum of the input light and obtains a light intensity POUTM at each wavelength λ.

The optical spectrum analyzer 38 sends the measured light intensity POUTM to the controller 40.

The controller 40 corrects the measured POUTM in accordance with the aforementioned calibration method and obtains an accurate output intensity POUTM with respect to an optical fiber amplifier 5.

(Measurement of Probe Light Output Intensity PASE from Optical Fiber Amplifier 5)

First, the controller 40 allows the shutter of the first optical attenuator 50 to transmit the signal light from the first light source 1 and adjusts this signal light to a desired light intensity level.

Similarly, the controller 40 permits the shutter of the second optical attenuator 51 to transmit the probe light from the second light source 2 and adjusts this probe light to a desired light intensity level.

Additionally, the controller 40 sets the first optical path switch 28 and the second optical path switch 33 in the steady state indicated by the solid lines in FIG. 8, and also sends a light intensity measurement command to the optical spectrum analyzer 38.

In this state, the first optical modulator 23 modulates the signal light emitted by the first light source 1 into the rectangular optical signal which, as shown in FIG. 9A, is turned on and off at the predetermined period T0.

Analogously, the third optical modulator 52 modulates the probe light emitted by the second light source 2 into the rectangular optical signal which, as shown in FIG. 9B, is turned on and off at the predetermined period TB.

The optical multiplexer 25 multiplexes these optical signals modulated at the predetermined periods T0 and TB as described above and supplies the multiplexed signal to the optical fiber amplifier 5 where the signal is optically amplified.

The amplified optical signal output from this optical fiber amplifier 5 is fed into the second optical modulator 35 via the first optical path switch 28 and the second optical path switch 33.

This second optical modulator 35 extracts an optical output in the partial period TA of the OFF period of the input amplified signal light and in the OFF period TB of the probe light. The second optical modulator 35 inputs the extracted optical output to the optical spectrum analyzer 38 via the second optical path switch 33.

This optical spectrum analyzer 38 regards an optical signal in the partial period TA of the OFF period in the input amplified optical signal as amplified spontaneous emission (ASE) and obtains a light intensity PASEM at each wavelength $\lambda$ of this amplified spontaneous emission.

The optical spectrum analyzer 38 sends the measured light intensity PASEM to the controller 40.

The controller 40 corrects the measured PASEM in accordance with the aforementioned calibration method and obtains an accurate output intensity PASEM from the optical fiber amplifier 5.

As have been described above, the optical amplifier evaluating apparatus and the optical amplifier evaluating method of the present invention can simply and accurately measure the wavelength characteristics of an optical fiber amplifier by combining the pulse method using optical modulators and the probe method.

Also, in the optical amplifier evaluating apparatus and the optical amplifier evaluating method, signal light and probe light are not modulated after being multiplexed but have different optical paths. Accordingly, the wavelength characteristics in the vicinity of a saturated signal wavelength can be evaluated.

As has been described above, the present invention, therefore, can provide an optical amplifier evaluating method and optical amplifier evaluating apparatus for evaluating the wavelength characteristics of an optical amplifier, which, by combining the pulse method using optical modulators and the probe method, solve the drawbacks that (1) to measure the wavelength characteristics of an optical amplifier, it is necessary to prepare wavelength-multiplexed signal light throughout measurement wavelengths and measure the gain and noise figure at each signal wavelength, and this enlarges and complicates the apparatus, (2) the conventional probe method cannot measure the characteristics in the vicinity of a saturated signal wavelength, and (3) the conventional method combining the probe method and the pulse method has poor measurement accuracy.

What is claimed is:

1. An optical amplifier evaluating apparatus comprising:
    a first light source device for outputting rectangular signal light which is turned on and off at a predetermined period;
    a second light source device for outputting probe light;
    an optical multiplexer for multiplexing the probe light and the signal light output from said first light source device and outputting multiplexed light to an input terminal of an optical fiber amplifier as an object to be measured;
    an optical modulator for extracting, from an output from an output terminal of said optical fiber amplifier, an output signal in an OFF period of the signal light;
    a light intensity measuring device for measuring intensity of input light to an input terminal;
    optical switching means for switching optical paths between said optical multiplexer, said optical fiber amplifier, said optical modulator, and the input terminal of said light intensity measuring device; and
    a controller for switching said optical switching means such that said light intensity measuring device measures a light intensity (Pout) in a region where the output signal light from said optical fiber amplifier is in an OFF period and the probe light is output, a light intensity (Pase) in a region where the signal light is in the OFF period and the probe light is not output, and a light intensity (Pin) of an input signal of the probe light to said optical fiber amplifier, and for obtaining a gain of said optical fiber amplifier from values of the measured light intensities.

2. An optical amplifier evaluating apparatus according to claim 1, wherein said second light source device comprises ON-OFF means for turning on and off the probe light, and said ON-OFF means inputs ON-OFF light to said optical multiplexer.

3. An optical amplifier evaluating apparatus according to claim 1, wherein said controller obtains a noise figure from the values of the light intensities.

4. An optical amplifier evaluating apparatus according to claim 1, wherein said second light source device comprises an optical attenuator, and an output from said optical attenuator i s input to said optical multiplexer.

5. An optical amplifier evaluating apparatus according to claim 2, wherein said second light source device comprises an optical attenuator, and an output from said attenuator is input to said ON-OFF means.

6. An optical amplifier evaluating apparatus according to claim 1, wherein said controller changes a frequency of the probe light from said second light source device.

7. An optical amplifier evaluating apparatus according to claim 1, wherein said light intensity measuring device is a spectrum analyzer, and the probe light from said second light source device is composed of light having a plurality of frequencies.

8. An optical amplifier evaluating method comprising:
    multiplexing output rectangular signal light from a first light source with probe light from a second light source by an optical multiplexer and applying multiplexed light to an optical fiber amplifier as an object to be measured, and extracting the signal light output from said optical fiber amplifier by an optical modulator and obtaining a gain and noise figure as wavelength characteristics of said optical fiber amplifier from a light intensity in a region where the signal light is in an OFF period and the probe light is output, a light intensity in a region where the signal light is in the OFF period and the probe light is not output, and a light intensity of an input signal of the probe light to said optical fiber amplifier.

9. An optical amplifier evaluating method comprising multiplexing output rectangular signal light from a first light source with light, obtained after output probe light from a second light source is modulated by an optical modulator into a rectangular optical signal which is turned on and off at a predetermined period, by an optical multiplexer and applying multiplexed light to an optical fiber amplifier (5) as an object to be measured, and extracting the signal light output from said optical fiber amplifier by another optical modulator and obtaining a gain and noise figure as wavelength characteristics of said optical fiber amplifier from a light intensity in a region where the signal light is in an OFF period and the probe light is output in an ON period, a light intensity in a region where the signal light is in the OFF period and the probe light is in the OFF period, and a light intensity of an input signal of the probe light to said optical fiber amplifier.

10. An optical amplifier evaluating apparatus comprising:

a first light source for outputting signal light;

a first optical modulator for modulating the signal light into a rectangular optical signal which is turned on and off at a predetermined period;

a second light source for outputting probe light, and an optical multiplexer for multiplexing the probe light and optical signal output from said modulator and selectively outputting multiplexed light to an input terminal of an optical fiber amplifier as an object to be measured;

optical path switching means for switching connection states of the input terminal and an output terminal of said optical fiber amplifier;

a second optical modulator for extracting the signal light switched by said optical path switching means and output from the output terminal of said optical fiber amplifier; and a controller for controlling said first optical modulator, said second optical modulator, and said optical path switching means, and analyzing means for obtaining a light intensity in a region where the signal light is in an OFF period and the probe light is output, a light intensity in a region where the signal light is in the OFF period and the probe light is not output, and a light intensity of an input signal of the probe light to said optical fiber amplifier, thereby obtaining a gain and noise figure as wavelength characteristics of said optical fiber amplifier.

11. An optical amplifier evaluating apparatus according to claim 10, further comprising a third optical modulator arranged between said second light source and said optical multiplexer to modulate the probe light output from said second light source into a rectangular optical signal which is turned on and off at a predetermined period.

12. An optical amplifier evaluating method comprising the steps of:

outputting rectangular signal light which is turned on and off at a predetermined period from a first light source device;

outputting probe light from a second light source device;

multiplexing the probe light and the signal light output from said first light source device by an optical multiplexer and outputting multiplexed light to an optical fiber amplifier as an object to be measured;

extracting, by an optical modulator, an output signal in an OFF period of the signal light from an output from an output terminal of said optical fiber amplifier;

measuring an intensity of input light to an input terminal by a light intensity measuring device;

switching optical paths between said optical multiplexer, said optical fiber amplifier, said optical modulator, and the input terminal of said light intensity measuring device by optical switching means; and switching said optical switching means by a controller such that said light intensity measuring device measures a light intensity (Pout) in a region where the output signal light from said optical fiber amplifier is in an OFF period and the probe light is output, a light intensity (Pase) in a region where the signal light is in the OFF period and the probe light is not output, and a light intensity (Pin) of an input signal of the probe light to said optical fiber amplifier, thereby obtaining a gain of said optical fiber amplifier from values of the measured light intensities.

* * * * *